US009704073B2

(12) United States Patent
Okumura

(10) Patent No.: US 9,704,073 B2
(45) Date of Patent: Jul. 11, 2017

(54) COLOR CONVERSION APPARATUS, LOOK-UP TABLE GENERATING METHOD, AND LOOK-UP TABLE GENERATING APPARATUS

(71) Applicant: SEIKO EPSON CORPORATION, Tokyo (JP)

(72) Inventor: Yoshio Okumura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/513,835

(22) Filed: Oct. 14, 2014

(65) Prior Publication Data
US 2015/0161488 A1   Jun. 11, 2015

(30) Foreign Application Priority Data
Dec. 11, 2013   (JP) .................................. 2013-255736

(51) Int. Cl.
*G06K 15/02*   (2006.01)
*H04N 1/60*   (2006.01)

(52) U.S. Cl.
CPC ..... *G06K 15/1868* (2013.01); *G06K 15/1823* (2013.01); *H04N 1/6052* (2013.01); *G06K 2215/0094* (2013.01)

(58) Field of Classification Search
CPC combination set(s) only.
See application file for complete search history.

(56) References Cited

U.S. PATENT DOCUMENTS

| 5,881,211 A | * | 3/1999 | Matsumura .......... H04N 1/6025 |
| | | | 358/1.5 |
| 7,605,943 B2 | | 10/2009 | Berns et al. |
| 7,652,789 B2 | | 1/2010 | Berns et al. |

(Continued)

FOREIGN PATENT DOCUMENTS

| EP | 0779736 A2 | 6/1997 |
| JP | 2007-516663 A | 6/2007 |

(Continued)

OTHER PUBLICATIONS

Extended European Search Report for European Patent Application No. 14197184.6 dated Feb. 27, 2015.

*Primary Examiner* — Christopher D Wait
(74) *Attorney, Agent, or Firm* — Global IP Counselors, LLP

(57) ABSTRACT

A color conversion apparatus includes a storage section configured to store a look-up table specifying a correspondence relationship between an used amount of a first color material used for a formation of a printing material in a printing device and an used amount of a second color material used for a formation of a color reproduction image in an image-forming apparatus, with the look-up table further specifying the correspondence relationship indicating a first output characteristic for a first region included in an input color space represented by a color of the first color material, and further specifying the correspondence relationship indicating a second output characteristic, which is different from the first output characteristic, for a second region, which is different from the first region, included in the input color space, and a color conversion section configured to perform a color conversion in reference to the look-up table.

5 Claims, 22 Drawing Sheets

(56) References Cited

U.S. PATENT DOCUMENTS

2005/0094169 A1* 5/2005 Berns ............... H04N 1/6033
   358/1.9
2008/0151276 A1* 6/2008 Mori ............... H04N 1/603
   358/1.9

FOREIGN PATENT DOCUMENTS

| JP | 4388554 B2 | 12/2009 |
| JP | 4946908 B2 | 6/2012 |
| WO | 2005/043884 A1 | 5/2005 |
| WO | 2005/043889 A1 | 5/2005 |

* cited by examiner

Fig. 3

LUT 200

| USED AMOUNT OF THE 1ST COLOR MATERIAL | | | | USED AMOUNT OF THE 2ND COLOR MATERIAL | | | | | INDEX VALUE | | | |
|---|---|---|---|---|---|---|---|---|---|---|---|---|
| | | | | | | | | | | ΔE | | |
| C | M | Y | K | C | M | Y | K | Ic | Im | D50 | F10 | F2 | IN1, IN2, ... |
| ... | ... | ... | ... | ... | ... | ... | ... | ... | ... | ... | ... | ... | ... |
| (FIRST REGION R1) | | | | ... | ... | ... | ... | ... | ... | 0.5 | 0.4 | 1.0 | ... |
| | | | | ... | ... | ... | ... | ... | ... | 1.3 | 0.5 | 0.9 | ... |
| | | | | ... | ... | ... | ... | ... | ... | 1.0 | 0.7 | 0.5 | ... |
| | | | | ... | ... | ... | ... | ... | ... | 1.6 | 0.8 | 0.6 | ... |
| | | | | ... | ... | ... | ... | ... | ... | 0.7 | 0.9 | 1.0 | ... |
| Dc | Dm | Dy | Dk | d_c | d_m | d_y | d_k | d_lc | d_lm | ΔE_D50 | ΔE_F10 | ΔE_F2 | ... |
| (SECOND REGION R2) | | | | ... | ... | ... | ... | ... | ... | 0.5 | 0.9 | 1.4 | ... |
| | | | | ... | ... | ... | ... | ... | ... | 0.7 | 1.1 | 1.5 | ... |
| | | | | ... | ... | ... | ... | ... | ... | 0.9 | 1.2 | 1.0 | ... |
| | | | | ... | ... | ... | ... | ... | ... | 0.8 | 1.6 | 0.9 | ... |
| | | | | ... | ... | ... | ... | ... | ... | 0.7 | 1.4 | 1.2 | ... |

G1 → LUT 241 (First Region R1); N1 Point; LUT 242 (Second Region R2); $N1 = N_g^4$ For Example, $\Delta E_{F10-F2} \leq TH1$, $\Delta E_{D50} > TH2$ included For Example, $\Delta E_{D50} \leq TH2$, $\Delta E_{F10-F2} > TH1$ included

ORIGINAL COMPREHENSIVE LUT 210

| G1 | USED AMOUNT OF THE FIRST COLOR MATERIAL | | | | USED AMOUNT OF THE SECOND COLOR MATERIAL | | | | | |
|---|---|---|---|---|---|---|---|---|---|---|
| | C | M | Y | K | C | M | Y | K | lc | lm |
| | ... | ... | ... | ... | ... | ... | ... | ... | ... | ... |
| N1 POINT | ... | ... | ... | ... | ... | ... | ... | ... | ... | ... |
| | $D_c$ | $D_m$ | $D_y$ | $D_k$ | $d_c$ | $d_m$ | $d_y$ | $d_k$ | $d_{lc}$ | $d_{lm}$ |
| | ... | ... | ... | ... | ... | ... | ... | ... | ... | ... |
| | ... | ... | ... | ... | ... | ... | ... | ... | ... | ... |

Fig. 4A

SPLIT LUT 231 (230)

(COMPLEXION COLOR REGION – EMPHASIS ON VISUAL EFFECTS)

| G2, G3 | USED AMOUNT OF THE FIRST COLOR MATERIAL | | | | USED AMOUNT OF THE SECOND COLOR MATERIAL | | | | | | INDEX VALUE | |
|---|---|---|---|---|---|---|---|---|---|---|---|---|
| | | | | | | | | | | | ΔE | |
| | C | M | Y | K | C | M | Y | K | lc | lm | D50 | F10 |
| | ... | ... | ... | ... | ... | ... | ... | ... | ... | ... | ... | ... |
| | 0 | 57 | 75 | 0 | ... | ... | ... | ... | ... | ... | 0.5 | 0.4 |
| | 20 | 57 | 75 | 0 | ... | ... | ... | ... | ... | ... | 1.3 | 0.5 |
| | 38 | 57 | 75 | 0 | ... | ... | ... | ... | ... | ... | 1.0 | 0.7 |
| | 0 | 75 | 75 | 0 | ... | ... | ... | ... | ... | ... | 1.6 | 0.8 |
| | 20 | 75 | 75 | 0 | ... | ... | ... | ... | ... | ... | 0.7 | 0.9 |
| | ... | ... | ... | ... | ... | ... | ... | ... | ... | ... | ... | ... |
| Np POINT | $D_c$ | $D_m$ | $D_y$ | $D_k$ | $d_c$ | $d_m$ | $d_y$ | $d_k$ | $d_{lc}$ | $d_{lm}$ | $\Delta E_{D50}$ | $\Delta E_{F10}$ |
| | ... | ... | ... | ... | ... | ... | ... | ... | ... | ... | ... | ... |

Fig. 4B

SPLIT LUT GROUP 220

| LUT No. | Target Region | Output Characteristic | |
|---|---|---|---|
| 1 | ⋮ | ⋮ | ~ 230 |
| 2 | ⋮ | ⋮ | ~ 230 |
| ⋮ | ⋮ | ⋮ | ~ 230 |
| ⋮ | Complexion Color Region | Emphasis on Visual Effects | ~ 231 (230) |
| ⋮ | Same as Above | Emphasis on Color Difference | ~ 230 |
| ⋮ | Same as Above | Emphasis on Low Granular Feeling | ~ 230 |
| ⋮ | Same as above | Emphasis on Gradation | ~ 230 |
| ⋮ | Same as Above | Ink Save | ~ 230 |
| ⋮ | Same as Above | ⋮ | ~ 230 |
| ⋮ | Gray Region | Emphasis on Visual Effects | ~ 230 |
| ⋮ | Same as Above | Emphasis on Color Difference | ~ 232 (230) |
| ⋮ | Same as Above | Emphasis on Low Granular Feeling | ~ 230 |
| ⋮ | Same as above | Emphasis on Gradation | ~ 230 |
| ⋮ | Same as Above | Ink Save | ~ 230 |
| ⋮ | Same as Above | ⋮ | ~ 230 |
| ⋮ | Color Chart Region | Emphasis on Visual Effects | ~ 230 |
| ⋮ | Same as Above | Emphasis on Color Difference | ~ 230 |
| ⋮ | Same as Above | Emphasis on Low Granular Feeling | ~ 230 |
| ⋮ | Same as above | Emphasis on Gradation | ~ 230 |
| ⋮ | Same as Above | Ink Save | ~ 230 |
| ⋮ | Same as Above | ⋮ | ~ 230 |
| ⋮ | Characteristic Region | Emphasis on Visual Effects | ~ 230 |
| ⋮ | Same as Above | Emphasis on Color Difference | ~ 230 |
| ⋮ | Same as Above | Emphasis on Low Granular Feeling | ~ 230 |
| ⋮ | Same as above | Emphasis on Gradation | ~ 230 |
| ⋮ | Same as Above | Ink Save | ~ 230 |
| ⋮ | Same as Above | ⋮ | ~ 230 |
| ⋮ | ⋮ | ⋮ | ~ 230 |

Fig. 5

PRINTING COLOR PROFILE PR1

(D50)

| | C | M | Y | K | L* | a* | b* |
|---|---|---|---|---|---|---|---|
| G1 | 0 | 0 | 0 | 0 | $L_{0-D50}$ | $a_{0-D50}$ | $b_{0-D50}$ |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |
| N1 Point | Dc | Dm | Dy | Dk | $L_{D-D50}$ | $a_{D-D50}$ | $b_{D-D50}$ |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |

PRINTING COLOR PROFILE PR2

(F10)

| | C | M | Y | K | L* | a* | b* |
|---|---|---|---|---|---|---|---|
| G1 | 0 | 0 | 0 | 0 | $L_{0-F10}$ | $a_{0-F10}$ | $b_{0-F10}$ |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |
| N1 Point | Dc | Dm | Dy | Dk | $L_{D-F10}$ | $a_{D-F10}$ | $b_{D-F10}$ |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |

PRINTING COLOR PROFILE PR3

(F2)

| | C | M | Y | K | L* | a* | b* |
|---|---|---|---|---|---|---|---|
| G1 | 0 | 0 | 0 | 0 | $L_{0-F2}$ | $a_{0-F2}$ | $b_{0-F2}$ |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |
| N1 Point | Dc | Dm | Dy | Dk | $L_{D-F2}$ | $a_{D-F2}$ | $b_{D-F2}$ |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |

SPECTRAL NEUGEBAUER MODEL $$R(\lambda) = a_w R_w(\lambda) + a_c R_c(\lambda) + \cdots + a_k R_k(\lambda)$$

$$a_w = (1-f_c)(1-f_m)(1-f_y)$$
$$a_c = f_c(1-f_m)(1-f_y)$$
$$a_m = (1-f_c)f_m(1-f_y)$$
$$a_y = (1-f_c)(1-f_m)f_y$$
$$a_r = (1-f_c)f_m f_y$$
$$a_g = f_c(1-f_m)f_y$$
$$a_b = f_c f_m(1-f_y)$$
$$a_k = f_c f_m f_y$$

MURRAY-DAVIS MODEL $$f_c = f_{1D-LUT}(d_c)$$

CELL-DIVISION YULE-NIELSEN SPECTRAL
NEUGEBAUER MODEL

INK COATING RATIO fc(d)

CALCULATING SPECTRAL REFLECTANCE $R(\lambda)$ $$R(\lambda) = \left(\sum a_i R_i(\lambda)^{1/n}\right)^n$$

$$= \left(a_{11} R_{11}(\lambda)^{1/n} + a_{12} R_{12}(\lambda)^{1/n} + a_{21} R_{21}(\lambda)^{1/n} + a_{22} R_{22}(\lambda)^{1/n}\right)^n$$

$$a_{11} = (1 - f_c)(1 - f_m)$$
$$a_{12} = (1 - f_c) f_m$$
$$a_{21} = f_c (1 - f_m)$$
$$a_{22} = f_c f_m$$

COLOR CONVERSION APPARATUS, LOOK-UP TABLE GENERATING METHOD, AND LOOK-UP TABLE GENERATING APPARATUS

CROSS-REFERENCE TO RELATED APPLICATIONS

This application claims priority to Japanese Patent Application No. 2013-255736 filed on Dec. 11, 2013. The entire disclosure of Japanese Patent Application No. 2013-255736 is hereby incorporated herein by reference.

BACKGROUND

Technical Field

The present invention relates to a color conversion apparatus, a look-up table generating method, and a look-up table generating apparatus.

Related Art

A process of conforming color tone, etc. of a print material, which is formed in a printer body, is performed by forming a proof in a print proof device before using the printer body. When an offset printer or a gravure printer is used for the printer body, a print material is formed by four types of color materials such as CMYK (cyan, magenta, yellow, black).

JP-A-2007-516663 (Patent Document 1) discloses a technology that ink amounts of grid points in a look-up table are optimized for a purpose of optimizing an image quality element such as color reproducibility.

JP-A-2009-200820 (Patent Document 2) discloses a technology for generating a color conversion LUT (look-up table) that the color data of RGB (Red, Green, Blue) color space, which is dependent on a device characteristic of a scanner, is converted to the ink amounts $d_c$, $d_m$, $d_y$, $d_k$, $d_{lc}$, $d_{lm}$ of CMYKlclm (cyan, magenta, yellow, black, light cyan, light magenta) inks. The document discloses an optimization method of the ink amounts to realize a metameric matching when a LUT is generated.

SUMMARY

Various usage scenes of the printer body or the print proof device are considered depending on the user. Accordingly, in the print proof device, a high quality color reproduction image is desired in response to the intension of the user.

The technology disclosed in Patent Document 1 assumes an input image defined by a three-dimension color space such as sRGB color space or L*a*b* color space that a color value is clear so that it is not intended for an input image of a device-dependent color space such as a four-dimension color space of CMYK of color materials used to form a print material in the printer body. Accordingly, it does not provide a structure that after acquiring an input image characteristic such as a CMYK image, an image quality in response to the intension of the user is established.

The technology disclosed in Patent Document 2 assumes an input image defined by a three-dimension color space such as a RGB color space, which is dependent on a device characteristic of a scanner, so that in the same manner as described above, it is not intended for an input image of a device-dependent color space such as a four-dimension color space of CMYK of color materials used to form a print material in the printer body. Accordingly, it does not provide a structure that after acquiring an input image characteristic such as a CMYK image, an object of a metameric matching in response to the intension of the user is realized.

When the obtaining of a color reproduction image in response to the intension of the user in each region within a color space such as emphasis on visual effects for the complexion color included in the color reproduction image, emphasis on the metameric matching under a predetermined observation light source for the gray color, etc. is performed, this will lead to enhance the image quality of the color reproduction image.

The aforementioned problems are not limited to the technology for generating a LUT for the offset printer or the gravure printer, but it is also existed in various technologies.

With respect to the above points, an advantage of the present invention is to realize a color reproduction target intended by the user in each region of the input color space by a look-up table that specifies a correspondence relationship between the used amount of color materials that match to the color materials of the printing device and the used amount of color materials that match to the color materials of the image-forming apparatus.

In order to achieve one of the aforementioned objects, a color conversion apparatus of the present invention includes a storage section configured to store a look-up table specifying a correspondence relationship between an used amount of a first color material used for a formation of a printing material in a printing device and an used amount of a second color material used for a formation of a color reproduction image in an image-forming apparatus, with the look-up table further specifying the correspondence relationship indicating a first output characteristic for a first region included in an input color space represented by a color of the first color material, and further specifying the correspondence relationship indicating a second output characteristic, which is different from the first output characteristic, for a second region, which is different from the first region, included in the input color space, and a color conversion section configured to perform a color conversion in reference to the look-up table.

That is, the look-up table stored in the storage section specifies the correspondence relationship between the used amount of the first color material used in the printing device and the used amount of the second color material used in the image-forming apparatus. In one of the look-up tables, the correspondence relationship indicating the first output characteristic for the first region within the input color space is specified, and the correspondence relationship indicating the second output characteristic, which is different from the first output characteristic, for the second region, which is different, within the input color space is specified. A color conversion is performed in reference to the look-up table. Accordingly, the aforementioned aspect enables to realize a color reproduction target intended by the user in each region of the input color space by the look-up table that specifies the correspondence relationship between the used amount of color materials that match to the color materials of the printing device and the used amount of color materials that match to the color materials of the image-forming apparatus.

Further, one aspect of the present invention is a look-up table generating method for generating a look-up table that specifies a correspondence relationship between an used amount of a first color material used for a formation of a printing material in a printing device and an used amount of a second color material used for a formation of a color reproduction image in an image-forming apparatus, the method including generating the look-up table by synthesizing at least a first look-up table that specifies a correspondence relationship between the used amounts of the first and second color materials to indicate a first output characteristic for a first region included in an input color space represented by a color of the first color material, and a second look-up table that specifies a correspondence relationship between the used amounts of the first and second color materials to indicate a second output characteristic, which is different from the first output characteristic, for a second region included in the input color space.

That is, the generated look-up table specifies the correspondence relationship between the used amount of the first color material, which is used in the printing device, and the used amount of the second color material, which is used in the image-forming apparatus. In the look-up table, the correspondence relationship indicating the first output characteristic for the first region within the input color space is specified, and the correspondence relationship indicating the second output characteristic, which is different from the first output characteristic, for the second region within the input color space is specified. Accordingly, the aforementioned aspect enables to realize a color reproduction target intended by the user in each region of the input color space by the look-up table that specifies the correspondence relationship between the used amount of color materials that match to the color materials of the printing device and the used amount of color materials that match to the color materials of the image-forming apparatus.

The aforementioned first color material may be color materials that are used to form a print material in the printing device, and it includes the color materials that combine four colors such as CMYK, the color materials that combine more than or equal to five colors, and the color materials that combine less than or equal to three colors. The aforementioned second color material may be color materials that are used to form a color reproduction image in the image-forming apparatus, and it includes the color materials that combine more than or equal to five colors, and the color materials that combine less than or equal to four colors.

As an example of the aforementioned first and second regions, it includes a complexion color region, a gray region, a color chart region, etc. The first and the second regions may be a collection of discrete portions.

The output characteristic means an entire output trend within the region. For example, the output characteristic indicated for a region included in the input color space may be represented by at least one of a color difference between a color value of the first color material and a color value of the second color material under a predetermined observation light source, an index value representing a graininess of the color reproduction image, and an index value representing a gradation of the color reproduction image. In this aspect, an excellent example that realizes the color reproduction target intended by the user in each region of the input color space can be provided. The observation light source may be configured by a plurality of light sources.

The first output characteristic may include an output characteristic in which a color difference between a color value of the first color material and a color value of the second color material under a first observation light source is within a first range. The second output characteristic may include an output characteristic in which a color difference between a color value of the first color material and a color value of the second color material under a second observation light source, which is different from the first observation light source, is within a second range. In the present aspect, the color reproduction target intended by the user in each region of the input color space under the observation light source can be realized.

The first output characteristic may include an output characteristic in which an index value representing a graininess of the color reproduction image is within a third range. The second output characteristic may include an output characteristic in which an index value representing a graininess of the color reproduction image is outside of the third range. In the present aspect, the color reproduction target of the graininess intended by the user in each region of the input color space can be realized.

The look-up table may be generated by synthesizing at least a partial look-up table selected from a partial look-up table group that specifies the correspondence relationship between the used amounts of the first and second color materials to indicate an output characteristic corresponding to each region included in the input color space, as at least one of the first and second look-up tables. In this aspect, it makes easy to generate a look-up table.

Further, the look-up table may be generated by synthesizing at least a partial look-up table selected from a partial look-up table group that specifies the correspondence relationship between the used amounts of the first and second color materials to indicate an output characteristic corresponded to a corresponded combination in each combination between a region included in the input color space and an output characteristic, as at least one of the first and second look-up tables. In this aspect, it makes easy to generate a look-up table.

Further, the look-up table may be generated by receiving an input for selecting a region included in the input color space and an output characteristic corresponding to the region, selecting a partial look-up table that specifies the correspondence relationship between the used amounts of the first and second color materials to indicate the received output characteristic for the received region, from the look-up table group, and synthesizing at least the selected partial look-up table. In this aspect, it makes easy to generate a look-up table.

Further, a priority of the first region may be set higher than the priority of the second region when there is an overlapped region in the first and second regions. When at least the first and second look-up tables are synthesized, the look-up table that specifies the correspondence relationship between the used amounts of the first and second color materials to indicate the first output characteristic for the overlapped region is generated. In this aspect, the overlapped region indicates the output characteristic for the high priority region so that it is possible to suitably realize the color reproduction target intended by the user.

Further, the used amount of the second color material specified in a boundary section of at least one of the first and second regions in the input color space may be processed by smoothing. In this aspect, the output characteristic for the boundary section of the region becomes smooth so that it is possible to suitably realize the color reproduction target intended by the user.

Further, the present invention is capable of applying for a look-up table, a computer readable medium which records a look-up table, an image-forming apparatus in which a look-up table is provided, a look-up table generating apparatus which is provided with means corresponding to the aforementioned look-up table generating method, an image-forming apparatus, an image-forming system provided with an image-forming apparatus, programs which realize functions corresponding to each part of the aforementioned apparatuses or system, a computer readable medium which records the programs, etc. The aforementioned apparatuses and system may be configured by a plurality of separated parts.

BRIEF DESCRIPTION OF THE DRAWINGS

Referring now to the attached drawings which form a part of this original disclosure:

FIG. 3 is a diagram schematically exemplifying a data structure of the look-up table 200;

FIG. 4A is a diagram schematically exemplifying a data structure of an original comprehensive look-up table;

FIG. 4B is a diagram schematically exemplifying a data structure of a partial look-up table;

FIG. 5 is a diagram schematically exemplifying a configuration of a look-up table group having a plurality of partial look-up tables;

FIG. 8 is a diagram schematically exemplifying a data structure of a printing color profile PR0;

DETAILED DESCRIPTION OF EMBODIMENTS

Hereinafter, the preferred embodiments of the present invention will be described. Needless to say, the following embodiments merely exemplify the present invention, and all of the features shown in the embodiments are not always essential to the solving means of the present invention.

(1) OUTLINE OF PROOF SYSTEM

Figure 1:
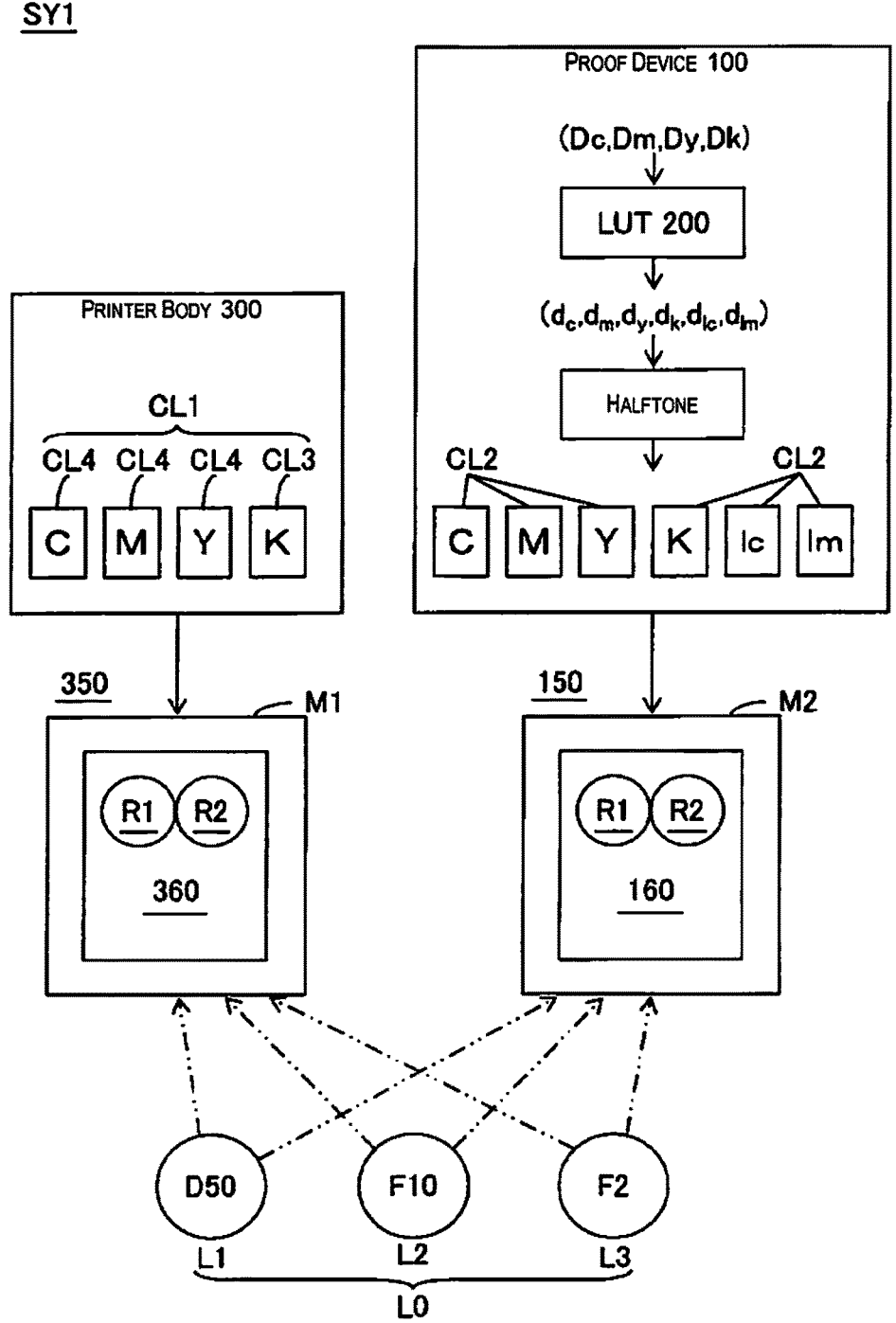
FIG. 1 is a diagram schematically exemplifying a configuration of a proof system SY1.

FIG. 1 schematically exemplifies a proof system SY1 in which a proof 150 of a print material 350 formed by a printer body (printing device) 300 is formed by a proof device (image-forming apparatus) 100. When color tones, etc. are confirmed by directly forming a print material in the printer body, it takes a high cost. Therefore, to be able to confirm the color tones, etc. of a print image 360 on the print material 350 without forming the print material 350, the proof device 100 forms a color reproduction image 160 of the print material 350.

The printer body (printing device) 300 includes an offset printer, a gravure printer, etc. The printer body 300 shown in FIG. 1 forms the print image 360 on a printing material M1 by using the first color material CL1 of CMYK (cyan, magenta, yellow, black). The first color material CL1 includes a color material of k (third color material CL3), a color material of CMY (fourth color material CL4) which is substitutable with the color (k) of the color material CL3.

The proof device (image-forming apparatus) 100 includes an inkjet printer, a wire dot printer, a laser printer, a line printer, a copying machine, a facsimile, a multifunction device which combines a part of these devices, etc. The proof device 100 shown in FIG. 1 forms the color reproduction image 160 on the printing material M2 by using the second color material CL2 of CMYKlclm. The light cyan (lc) is higher brightness color than cyan in a hue of the same system as cyan. The light magenta (lm) is higher brightness color than magenta in a hue of the same system as magenta. Needless to say, the second color material CL2 may be the color material of CMYKROrGr, etc. Red (R), orange (Or), or green (Gr) is the color substitutable with CMY. The proof device 100 shown in FIG. 1 converts each of the used amounts Dc, Dm, Dy, Dk of the first color material CL1 of CMYK to each of the used amounts $d_c$, $d_m$, $d_y$, $d_k$, $d_{lc}$, $d_{lm}$ of the second color material CL2 of CMYKlclm in accordance with a LUT (look-up table) 200, and the color reproduction image 160 is formed in accordance with the obtained amount $d_c$, $d_m$, $d_y$, $d_k$, $d_{lc}$, $d_{lm}$. When the ink used amount is converted to dots on the printing material M2, the gradation number of the gradation data is reduced by performing a predetermined halftone process such as a dither method, an error diffusion method, a density pattern method to the gradation data, which expresses each of the used amount $d_c$, $d_m$, $d_y$, $d_k$, $d_{lc}$, $d_{lm}$, and the ink dots are formed on the printing material M2 by ejecting ink droplets in accordance with the obtained multivalued data. The multivalued data is the data that expresses a condition of dot formation, or it may be binary data that expresses existence or non-existence of dot formation, or it may be multivalued data that is more than or equal to three gradations capable of corresponding to dots in different sizes such as large dot, medium dot, small dot. The binary data can be the data that corresponds to, for example, 1 for the existence of dot formation, and 0 for the non-existence of dot formation. As quaternary data, for example, the data can correspond to 3 for the large dot formation, 2 for the medium dot formation, 1 for the small dot formation, and 0 for non-existence of dot formation. The obtained color reproduction image is expressed in a condition of dot formation on the printing material M2.

The print image 360 or the color reproduction image 160 changes the color tone depending on the kinds of the observation light source L0. Here, the symbol L0 is used when the respective light sources L1 to L3 are collectively referred. The standardized observation light source L0 includes D50 light source, D55 light source, D65 light source, D75 light source, A light source, F2 light source, F7 light source, F10 light source, F11 light source, etc. The change of the color tone is dependent on the kinds of the color materials.

In the print industry, for example, D50 light source indicating a spectral distribution, which does not exist in actual illumination, is the standard light source. The print performance is observed under the D50 light source so that as the proof device of the printing device, it is important to assure the color precision when it is viewed under the standard D50 light source. On the other hand, it is assumed that the print material provided by the printer body or the color reproduction image provided by the proof device is actually viewed in the environment of a light source which is different from the D50 light source, and the mixed environment where a plurality of light sources such as D65 light source and A light source are mixed is also assumed. Accordingly, even though the color tones of the print image 360 and the color reproduction image 160 are matched under the D50 light source L1, there is a case that the color tones of the print image 360 and the color reproduction image 160 are not matched under different light sources L2, L3.

Also, there is a Direct Digital Color Proofer (DDCP device) in which the color materials of CMYK is only used in the same manner as the printer body. When the color materials of CMYK, which are the same as the printer body, are used in the print proof device, a high precision of the color reproducibility can be realized, but a color reproduction image reflected by the intension of the user that is a high image quality of the color reproduction image, etc. such as a picture quality, which is the characteristic of the inkjet printer using more color inks, cannot be obtained. Also, such DDCP device is expensive.

Further, the DDCP device can truly reproduce a print image formed by the printer body, but it does not have a mechanism that switches a target of metameric matching reflected by the intension of the user based on the characteristic of print image formed by the color materials of CMYK, and establishes the image quality.

The present technology can solve the problems in the aforementioned DDCP device, and can obtain the high image quality of the color reproduction image 160 in response to the intension of the user. For example, the color reproduction image 160 in response to the intension of the user in each region within the color space such as emphasis on visual effects for the complexion color included in the color reproduction image 160, emphasis on metameric matching for gray (e.g., middle-tone achromatic color, and vicinity of it) under the predetermined observation light source can be obtained in one LUT 200.

The LUT 200, which specifies a correspondence relationship between each of the used amounts Dc, Dm, Dy, Dk of the first color material CL1 and each of the used amounts $d_c$, $d_m$, $d_y$, $d_k$, $d_{lc}$, $d_{lm}$ of the second color material CL2, can be said as a color conversion LUT in view of the point that the CMYK four-dimensional color space data, which is dependent on the printer body, is converted to CMYKlclm color space data, which is dependent on the proof device. Also, the LUT 200 can be said as a color part plate LUT in view of the point that the use rate of CMY and K is converted, the use rate of C and lc is converted, and the use rate of M and lm is converted.

(2) STRUCTURE OF LOOK-UP TABLE AND OUTLINE OF GENERATING METHOD

Figure 2:
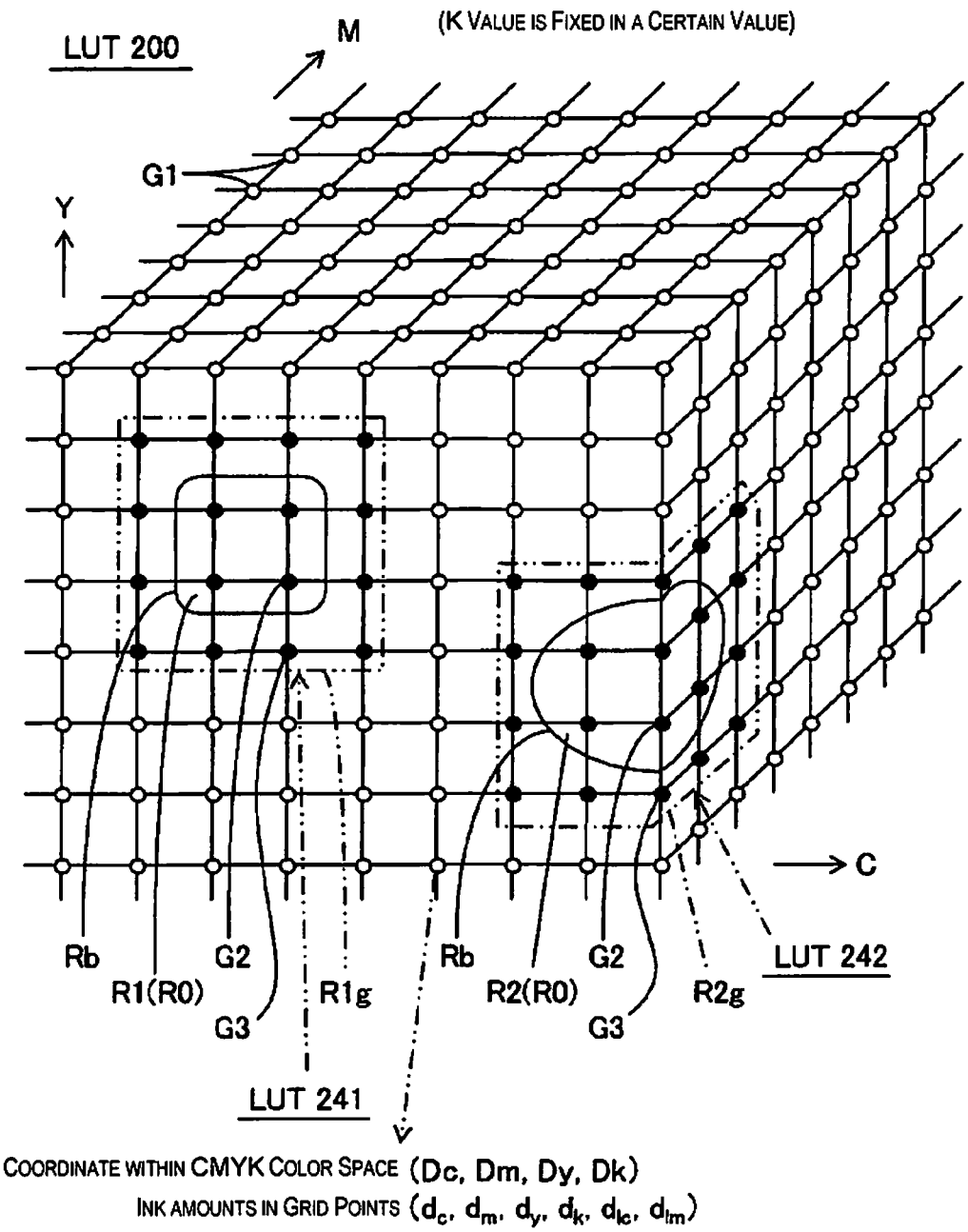
FIG. 2 is a diagram schematically exemplifying a configuration of a look-up table 200.

FIG. 2 schematically exemplifies a configuration of the LUT 200. FIG. 3 schematically exemplifies a data structure of the LUT 200 provided with an index value corresponding to each grid point (input point) G1. The inputs of the LUT 200 cannot be drawn since it is the four-dimension of CMYK. Therefore, the three-dimensional LUT 200 fixed in any one-dimensional point is schematically shown, and in FIG. 2, the grid points G1 of the LUT 200 are shown in the three-dimensional space of CMY that the K value is fixed. For example, when the grid points of Ng stage (Ng is an integer number more than or equal to 2) for the respective used amounts of CMYK are provided, the number of the grid points becomes $Ng^4$. When it is Ng=17, the number of the grid points becomes $N1=17^4=83521$. The used amount of K is Ng stage so that the number of the existence of CMY three-dimensional color space shown in FIG. 2 is Ng.

The grid point is a common term and means an input point specified in the LUT, and it is not specifically limited if the arrangement is corresponded to a coordinate of the input color space. Therefore, a plurality of grid points are evenly arranged in the input color space, and also, it may be unevenly arranged if the respective CMYK are differently positioned in the input color space.

As shown in FIG. 2, the coordinate (position) of the grid points G1 in the CMYK color space shows the respective used amounts Dc, Dm, Dy, Dk of the first color material CL1. The grid point ink amounts (respective used amounts of the second color material CL2) $d_c$, $d_m$, $d_y$, $d_k$, $d_{lc}$, $d_{lm}$ is stored in the respective grid points G1. With such configuration, in the LUT 200, the correspondence relationship between the used amount of the color material CL1 of CMYK and the used amount of the color material CL2 of CMYKlclm is specified for each of the grid points G1.

The present LUT 200 specifies the correspondence relationship indicating the first output characteristic for the first region R1 included in the CMYK color space (input color space) expressed by the colors of the first color material CL1, and specifies the correspondence relationship indicating the second output characteristic for the second region R2 included in the CMYK color space (input color space). The first and second regions R1, R2 in the LUT 200 are different regions (regions that do not overlap each other). The symbol R0 is a region when a partial region of the input color space including the regions R1, R2 is collectively referred. The region R0 means a range of the color reflected by the intension of the user in the input color space. The characteristic means overall trend. The first and second output characteristics are different output characteristics each other. The colors of the first region R1 exemplified in FIG. 3 are converted to the used amounts $d_c$, $d_m$, $d_y$, $d_k$, $d_{lc}$, $d_{lm}$ that the color difference $\Delta E_{F10\text{-}F2}$ between the print image 360 formed by the printer body and the color reproduction image 160 formed by the proof device under the observation light source, which evenly combines the F10 light source and the F2 light source, is within the predetermined range (e.g., less than or equal to 1.0). Further, the colors of the second region R2 exemplified in FIG. 3 are converted to the used amounts $d_c$, $d_m$, $d_y$, $d_k$, $d_{lm}$ that the color difference $\Delta E_{D50}$ between the print image 360 and the color reproduction image 160 under the D50 light source is within the predetermined range (e.g., less than or equal to 1.0). In the example of FIG. 3, the output characteristic is expressed by the color difference between the color value of the first color material and the color value of the second color material under the predetermined observation light source. The color value is expressed by L*, a*, b* defined by CIE (International Commission on Illumination) L*a*b* color space. When the color value of the first color material is expressed by $L_D$, $a_D$, $b_D$, and the color value of the second color material is expressed by $L_d$, $a_d$, $b_d$, the color difference ΔE may be calculated by $\Delta E = \{(L_d-L_D)^2+(a_d-a_D)^2+(b_d-b_D)^2\}^{1/2}$, or it may be calculated based on color difference equation ($\Delta E_{2000}$) of CIE DE2000.

Since the grid points G1 are discretely arranged in the input color space, the boundary sections Rb of the region R0 do not necessarily correspond to the position of the grid points G1 as shown in FIG. 2. In FIG. 2, the grid points used for converting the colors in the regions R0 by the interpolation arithmetic operation are indicated by symbols G2, G3, and the grid points in the regions R0 are indicated by a symbol G2. The grid points G3 are the adjacent grid points which are necessary for interpolating the output values $d_c$, $d_m$, $d_y$, $d_k$, $d_{lc}$, $d_{lm}$ even though it is out of the regions R0. Symbols R1g, R2g respectively indicate the ranges of the grid points G2, G3 used for the color conversion of the regions R1, R2.

Figure 6A:
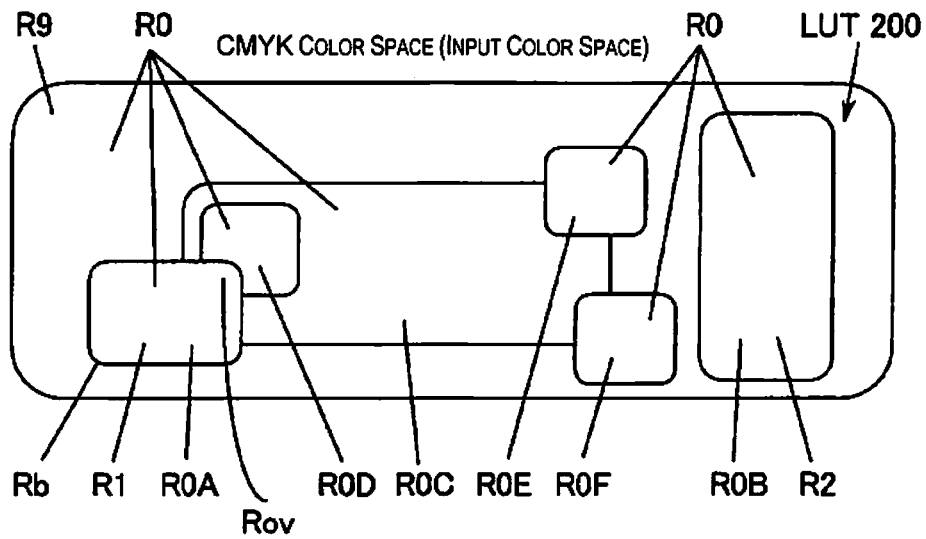
FIGS. 6A and 6B are a diagram schematically exemplifying a configuration of the look-up table 200 formed from the original comprehensive look-up table and the partial look-up tables.
Figure 6B:
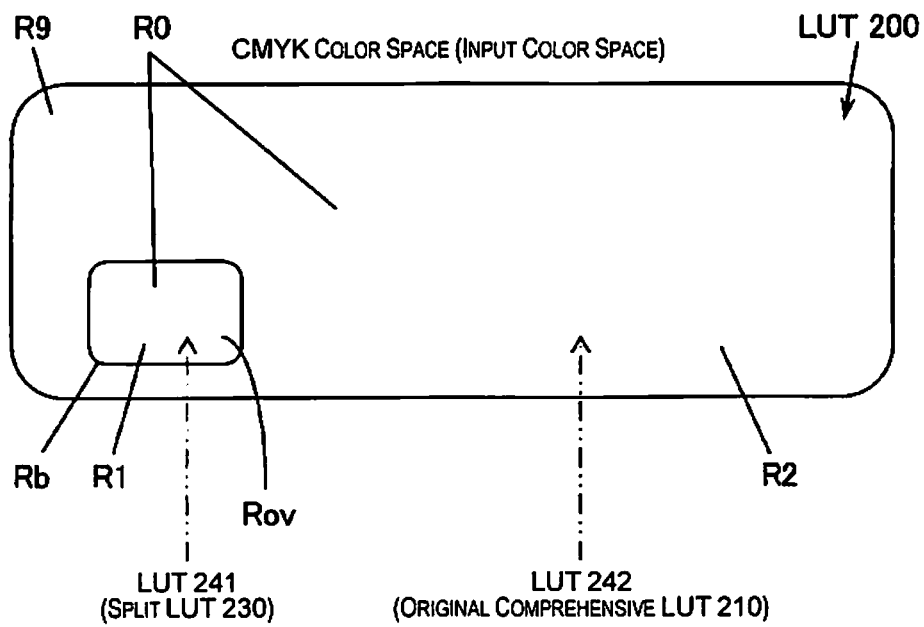

FIG. 4A schematically exemplifies a data structure of an original comprehensive look-up table LUT 210. FIG. 4B schematically exemplifies a data structure of a split LUT 230 (partial look-up table). FIG. 5 schematically exemplifies the split LUT 230 included in the split LUT group (partial look-up table group) 220. FIGS. 6A and 6B schematically exemplify the structure of the LUT 200 formed by the original comprehensive LUT 210 and the split LUT 230. The used amounts of color materials and index values shown in the LUTs 200, 230 are schematic number so that it does not limit the regions R0 and the output characteristics. Also, the index values may not include the data of the LUTs 200, 230.

The original comprehensive LUT 210 shown in FIG. 4A specifies the used amounts of the entire color materials CL1, CL2 of the input color space, and for example, it has $N1=Ng^4$ grid points G1 in the same manner as the LUT 200. The original comprehensive LUT 210 specifies the correspondence relationship to match the color tones of the print image 360 and the color reproduction image 160 under the predetermined observation light source. For example, when the color tones of the print image 360 and the color reproduction image 160 are matched under the D50 light source truly as possible, the original comprehensive LUT 210, which specifies a correspondence relationship to become the color difference $\Delta E_{D50}$ between the color value of the print image 360 and the color value of the color reproduction image 160 within the predetermined range (e.g., less than or equal to positive threshold value such as 1.0), is prepared. Such original comprehensive LUT 210 realizes the function to truly reproduce the print image 360 in the proof device 100 when it is directly used as the LUT 200 in the proof device 100.

Needless to say, the observation light source to match with the color tones may be a light source other than the D50 light source, and a plurality of light sources may be combined. The generating method of the original comprehensive LUT will be described in detail later.

The split LUT 230 as shown in FIG. 4B specifies the correspondence relationship of the used amounts of the color materials CL1, CL2 for the number of respective Np grid points G2, G3 which are lower number than N1 grid points of the LUTs 200, 210. The split LUT 230 also specifies the correspondence relationship of the used amounts of the color materials CL1, CL2 for the adjacent grid points G3 which are out of the regions R0, but this is because all of the colors within the regions R0 are converted by the interpolation arithmetic operation. Accordingly, the split LUT 230 having the grid points G2, G3 specifies the correspondence relationship of the used amounts of the color materials CL1, CL2 for the regions R0 included in the input color space.

As shown in FIG. 5, the split LUT 230 is respectively provided in a combination of the regions R0 included in the input color space and the output characteristic. The split LUT group 220 specifies the correspondence relationship of the used amounts of the color materials CL1, CL2 which indicate the output characteristic corresponding to the combination for each of the aforementioned combinations. The target region R0 may be a partial region in the input color space, and a complexion color region, a gray region, a color chart region, an ink save region, other characteristics regions, etc. can be exemplified, and it includes not only a group of regions, which is not divided, but also discrete regions. The complexion color region or the gray region is the typical example of the color region sensitive to the human eye. The color chart region is the color region to form a color chart, and it may be the discrete region. The ink save region is the region to save the used amount of the second color material CL2. The characteristic regions are collectively referred to the color region sensitive to the human eye.

In the split LUT 230 included in the split LUT group 220, as shown in FIG. 4B, the index values for converting the output characteristics, which indicate the regions R0 included in the input color space, into numeral values are associated. Accordingly, the split LUT group 220 configures the split LUT database associated with the index values. The output characteristics are quantified by at least one of the color difference ΔE between the color value of the first color material CL1 and the color value of the second color material CL2 under the predetermined observation light source, a graininess index value that expresses the graininess of the color reproduction image 160 (defined as IN1), and a gradation index value that expresses the gradation of the color reproduction image 160 (defined as IN2). These index values ΔE, IN1, IN2, etc. are collectively referred to an image quality estimation index IN. In FIG. 5, emphasis on visual effects, emphasis on color difference, emphasis on low granular feeling, emphasis on gradation, ink save, etc. are indicated as the output characteristics. The phrase "emphasis on visual effects" is the output characteristic that for example, the color difference $\Delta E_{F10\text{-}F2}$ between the color value of the print image 360 and the color value of the color reproduction image 160 under the observation light source, which means the fluorescent light that the HO light source and the F2 light source are mixed in the ratio of 1:1, is within the predetermined range (e.g., less than or equal to positive threshold value such as 1.0). Needless to say, the phrase "emphasis on visual effects" may be the output characteristic that the color difference between the color values of the both images 360, 160 under the observation light source such as a light source which is the mixtures of the D50 light source, the F10 light source, and the F2 light source in the ratio of 1:1:1, is within the predetermined range. The phrase "emphasis on color difference" is the output characteristic that the color difference $\Delta E_{D50}$ between the color value of the print image 360 and the color value of the color reproduction image 160 under the D50 light source is within the predetermined range (e.g., less than or equal to positive threshold value such as 1.0). The phrase "emphasis on low granular feeling" is the output characteristic that for example, the graininess index value IN1 of the color reproduction image 160 is within the predetermined range (e.g., less than or equal to positive threshold value). The phrase "emphasis on gradation" is the output characteristic that for example, the gradation index value IN2 of the color reproduction image 160 is within the predetermined range (e.g., less than or equal to positive threshold value).

When the LUT 200 is generated, at least, the first and second LUTs 241, 242 (see FIGS. 2 and 3) selected from the original comprehensive LUT 210 and the plurality of split LUTs 230 are synthesized. The first LUT 241 specifies the correspondence relationship of the used amounts of the first and second color materials CL1, CL2 for each of the grid points G2, G3 to indicate the first output characteristic for the first region R1 included in the CMYK color space expressed by the colors of the first color material CL1. The second LUT 242 specifies the correspondence relationship of the used amounts of the first and second color materials CL1. CL2 for each of the grid points G2, G3 to indicate the second output characteristic, which is different from the first output characteristic, for the second region R2 included in the aforementioned CMYK color space. The obtained LUT 200 is a comprehensive LUT including the LUTs 241, 242. The regions R0 in the generating method of the LUT 200 may be overlapped, and by synthesizing the overlapped region Rov of the regions R0 to indicate the output characteristic of any one of the regions R0, each of the regions R0 becomes different region (a region without overlapping) from each other in the final LUT 200.

The grid points G3 shown in FIG. 2 are positioned in the LUTs 241, 242 because the grid points G3 outside of the regions R0 are required to convert the colors of the boundary sections Rb and its adjacent regions R0 by the interpolation arithmetic operation. For example, the LUT 231 of the "emphasis on visual effects" having the grid points G2, G3 that convert the color of "complexion color region" has the output characteristic, the color difference $\Delta E_{F10\text{-}F2}$ between the color value of the print image 360 and the color value of the color reproduction image 160 for the color of "complexion color region" is within the predetermined range, in the grid points G2, G3.

Needless to say, as shown in FIG. 6A, it is not limited to two of the LUTs 241, 242 only used for the synthesis of the LUT 200. The LUT 200 shown in FIG. 6A has a structure that a complexion color region R0A, a gray region R0B, a color chart region R0C, and characteristic regions R0D, R0E, R0F are embedded in the comprehensive region R9 as the entire region of the LUT 200. Each of the regions R0A to R0F of the LUT 200 is formed based on the corresponding split LUT 230. The region other than the regions R0A to R0F within the comprehensive region R9 is formed based on the original comprehensive LUT 210. In this case, the first and second LUTs 241, 242 may be respectively selected from six kinds of the split LUTs 230 forming the original comprehensive LUT 210 and regions R0A to R0F. The region R0 that is collectively referred includes the regions R0A to R0F, R9.

Further, as shown in FIG. 6B, the LUT 200 may be generated by synthesizing only the original comprehensive LUT 210 and one kind of split LUT 230 as the LUTs 241, 242. The LUT 200 shown in FIG. 6B includes the overlapped region Rov where the entire first region R1 is overlapped with the comprehensive region R9, and the first output characteristic is indicated by forming the overlapped region Rov based on the split LUT 230, and the second output characteristic is indicated by forming a region as the second region R2, which is the comprehensive region R9 other than the overlapped region Rov, based on the original comprehensive LUT 210. Needless to say, the second region R2 may be formed based on the split LUT 230, and the first region R1, which is the comprehensive region R9 other than the second region R2, may be formed based on the original comprehensive LUT 210.

(3) OUTLINE OF LOOK-UP TABLE GENERATING APPARATUS, AND COLOR CONVERSION APPARATUS

Figure 7:
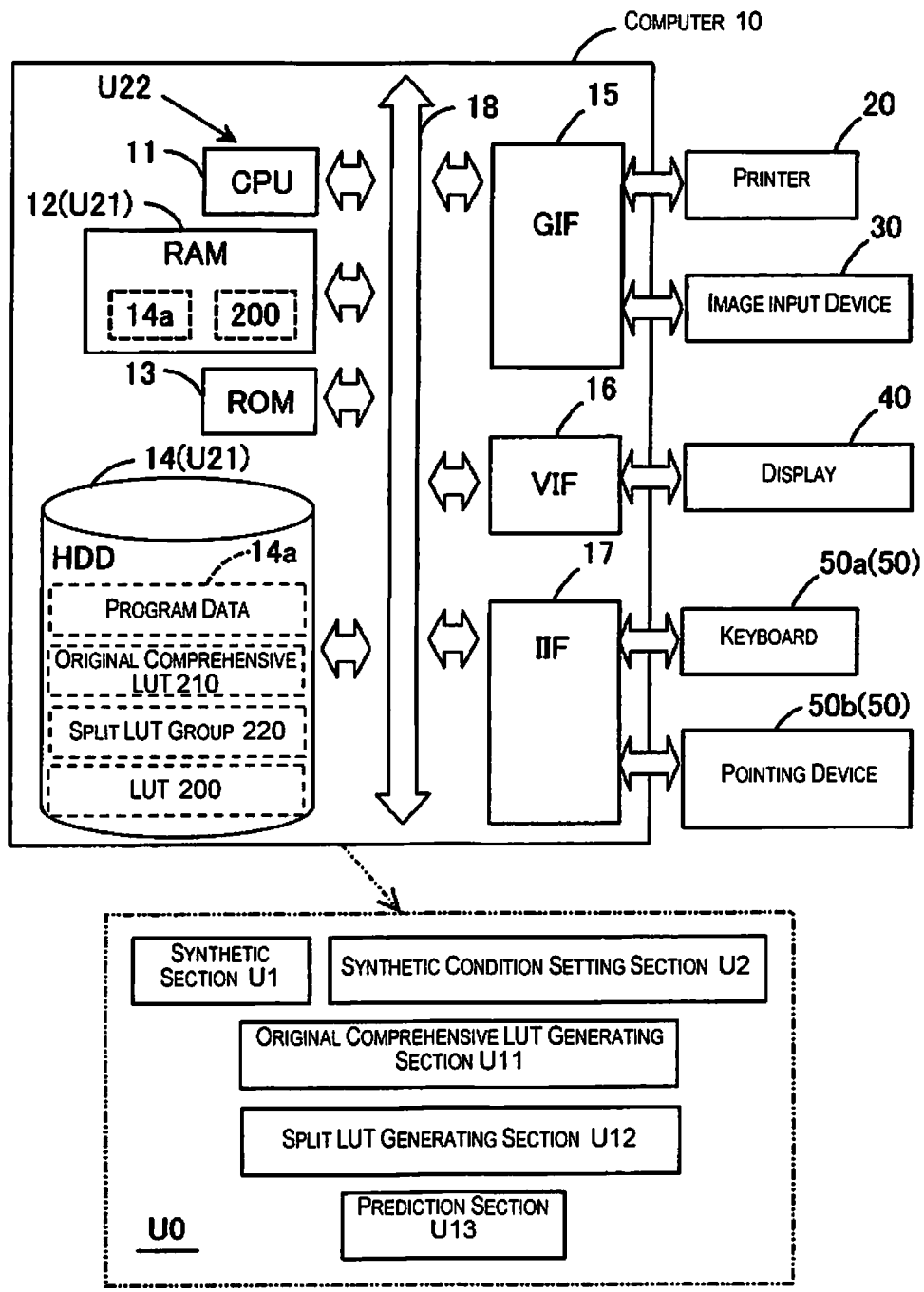
FIG. 7 is a block diagram schematically exemplifying a configuration of a computer 10.

FIG. 7 exemplifies a configuration of a computer 10 including a LUT (look-up table) generating apparatus U0. In the computer 10, a CPU (Central Processing Unit) 11, a RAM (Random Access Memory) 12, a ROM (Read Only Memory) 13, a hard disk drive (HDD) 14, a general-purpose interface (GIF) 15, a video interface (VIF) 16, an input interface (IIF) 17, etc. are connected to a bus 18 so as to input and output the information each other. In the HDD 14, the program data 14a, the original comprehensive LUT 210, the split LUT group 220, etc. for executing various programs, which includes an operation system (OS) and a LUT generating program, are stored. In the HDD 14, the generated LUT 200, etc. is also stored. The CPU 11 arbitrarily reads out the program data 14a to the RAM 12, and entirely controls the computer 10 in accordance with the program data 14a. The LUT generating program realizes the functions corresponding to the respective parts U1, U2, U11 to U13 of the LUT generating apparatus U0 by the computer 10, and the computer 10 is functioned as the LUT generating apparatus U0.

In the GIF 15, a printer 20 that is an image output device, a colorimetric device, an image input device 30 such as scanner, etc. are connected. In the GIF 15, the USB (Universal Serial Bus), etc. can be employed. The printer 20 may be the proof device 100, or may not be the proof device 100. In the VIF 16, a display 40 that is the image output device, etc. is connected. In the IIF 17, a keyboard 50a that is an operation input device 50, a pointing device 50b that is also the operation input device 50, etc. are connected. A mouse, etc. can be used for the pointing device 50b.

The LUT generating apparatus U0 shown in FIG. 7 is provided with a synthetic section U1, a synthetic condition setting section U2, an original comprehensive LUT generating section U11, a split LUT generating section (partial look-up table generating section) U12, and a prediction section U13, and generates the aforementioned LUT 200. The synthetic section U1 synthesizes the LUTs (original comprehensive LUT 210 or the split LUT 230) that specify the correspondence relationship between the used amounts of the first and second color materials CL1, CL2 indicating a different output characteristic for each of the regions R1 included in the input color space, which is expressed by the colors of the first color material CL1, and generates the final LUT 200. The synthetic condition setting section U2 receives a selection input of the split LUT 230, which is synthesized from the split LUT group 220, and receives an input of a priority of the split LUT 230 to be synthesized. The original comprehensive LUT generating section U11 associates the used amount of the second color material CL2, which is in the comprehensive region R9 predicted by the predication section U13, with the used amount of the first color material CL1, and generates the original comprehensive LUT 210. The split LUT generating section U12 associates the used amount of the second color material CL2, which is in the region R0 predicted by the predication section U13, with the used amount of the first color material CL1, and generates the split LUT 230. The prediction section U13 predicts the used amount of the second color material CL2 to approximate the color value (e.g., L*a*b* value) of the second color material CL2 formed in the color reproduction image 160 to a target color value in each observation light source L0 based on an evaluation value I (described later) that evaluates an approximation to the target color value (e.g., L*a*b* value) associated with the used amount of the first color material CL1 (e.g., Dc, Dm, Dy, Dk) for the observation light source L0.

FIG. 8 shows a printing color profile PR0 that specifies a correspondence relationship between the used amount of the first color material CL1 and the target color value. The printing color profile PR0 specifies, for example, N1 pair of the correspondence relationships between the used amounts Dc, Dm, Dy, Dk of the first color material CL1 and the target color values $L_D$, $a_D$, $b_D$ under the observation light source L0 of the first color material CL1 of the aforementioned used amounts Dc, Dm, Dy, Dk formed in the print material 350. When the used amount of the second color material CL2 is predicted to approximate the target color value for the plurality of the observation light sources L0, respectively, it is better to provide the printing color profiles PR1, PR2, PR3, . . . for each of the observation light sources L0. The printing color profile PR0 is used to generate the original comprehensive LUT 210 or the split LUT 230.

Here, the target color values specified in the printing color profile PR0, and the color values of the second color material CL2 formed in the color reproduction image 160 are preferably the color space of the device-independent (device-independent color space) and the uniform color space of the color values, but it may be possible to be the color value of the color space of the device-dependent (device-dependent color space), or it may be possible to be the color value of the color space which is not the uniform color space. The uniform color space of the device-independent may be CIE L*u*v* color space, etc. other than CIE Cal; color space. L* of the L*a*b* represents brightness, and a* and b* represent hue and saturation.

When the original comprehensive LUT 210 or the split LUT 230 are generated, the LUT generating apparatus U0 synthesizes the original comprehensive LUT 210 and the split LUT 230, which is set by the synthetic condition setting section U2, in the synthetic section U1, and generates the LUT 200 and stores it in the HDD 14. In reference to the LUT 200, the color conversion from the used amount of the first color material CL1 to the used amount of the second color material CL2 can be performed.

The computer 10 shown in FIG. 7 reads out the LUT 200, which is stored in the HDD 14, to the RAM 12, and is capable of executing the color conversion from the used amounts Dc, Dm, Dy, Dk of the first color material CL1 to the used amounts $d_c$, $d_m$, $d_y$, $d_k$, $d_{lc}$, $d_{lm}$ of the second color material CL2 in reference to the LUT 200. In this case, the color conversion apparatus is included in the computer 10, and the HDD 14 and the RAM 12 configure a storage section U21, and the computer 10 that executes the color conversion program included in the program data 14a configures a color conversion section U22. Needless to say, the color conversion apparatus may include a computer which is different from the LUT generating apparatus U0.

(4) EXPLANATION OF EXAMPLE OF LOOK-UP TABLE GENERATING PROCESS

Next, an example of the process for generating the LUT 200 will be described.

(4-1) Example of Generation of Printing Color Profile

Figure 9:
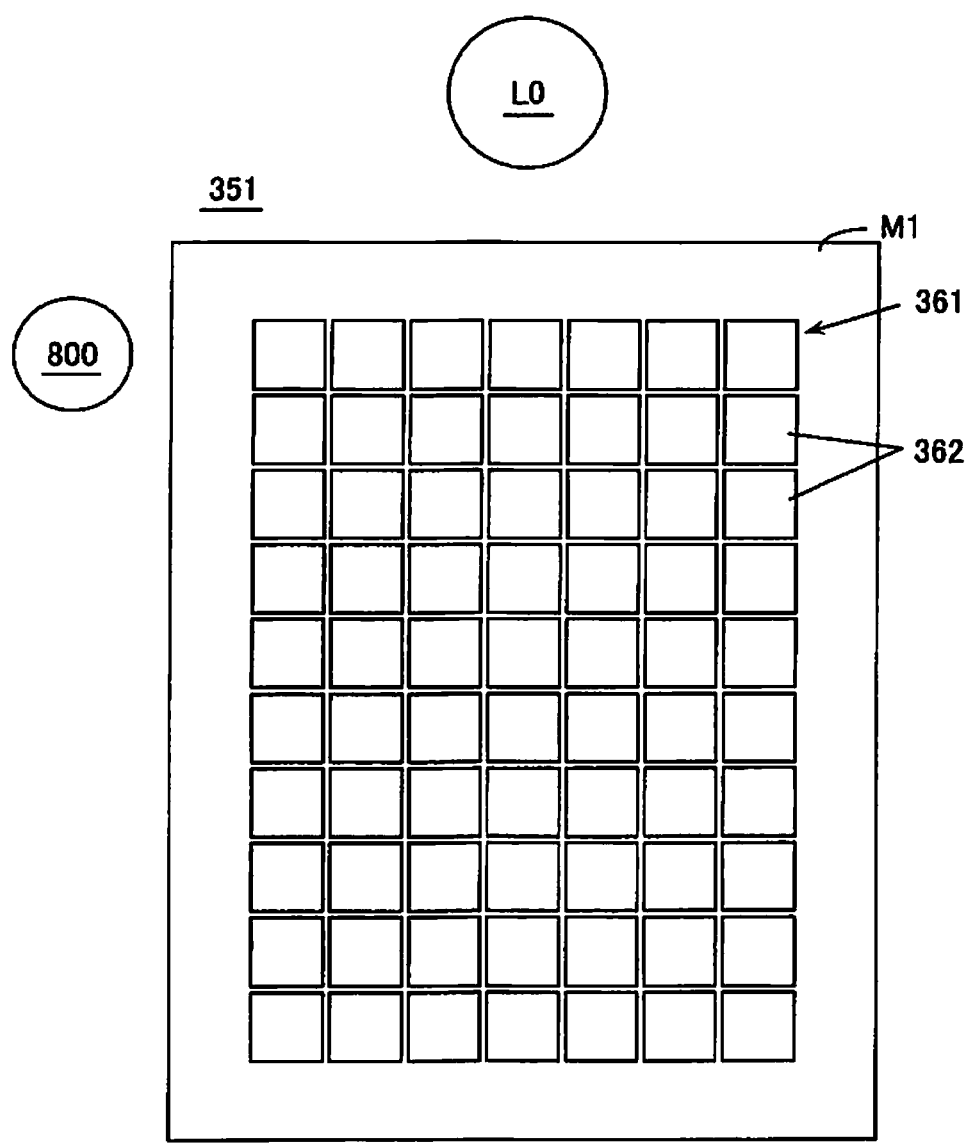
FIG. 9 is a diagram schematically explaining an example of a generation method of the printing color profile PR0.

FIG. 9 schematically exemplifies a method for generating a printing color profile PR0 that generates the original comprehensive LUT 210 and the split LUT 230.

The printer body 300 forms a chart print material 351 to make the printing color profile PR0 as exemplified in FIG. 9. The print material 351 forms a color chart 361 on the printing material M1. The plurality of patches 362 is arranged in the chart 361 two-dimensionally. The patches 362 are called as a color chart, and it means a region as a colorimetric unit by the colorimetric device 800. Each of the patches 362 corresponds to the used amounts of the color materials Dc, Dm, Dy, Dk of the printing color profile PR0. When the printing color profile PR0 is generated in each of the observation light sources L0, the color of the chart 361 may be measured by switching the observation light sources and using the same print material 351. For example, when the original comprehensive LUT 210, which matches the color tones between the print image 360 of the CMYK color space and the color reproduction image 160 of the CMYKl-clm color space as much as possible under the D50, D55, D65, A, F11 light sources and many of the observation light sources, is generated, the colors of the chart 361 are measured by sequentially switching the D50, D55, D65, A, F11 light sources (including a pseudo light source and so forth), and the color profile PR0, which associates the target color values $L_D$, $a_D$, $b_D$ with the used amounts Dc, Dm, Dy, Dk of the first color material for the respective D50, D55, D65, A, F11 light sources, may be generated.

For example, when the color of each patch 362 is measured by using the D50 light source L1 as the observation light source L0, and the plural pairs of the color values $L_{D\text{-}D50}$, $a_{D\text{-}D50}$, $b_{D\text{-}D50}$ are respectively associated with the used amounts Dc, Dm, Dy, Dk of the first color material, the printing color profile PR1 shown in FIG. 8 can be generated. This process may be performed for all of N1 grid points of the printing color profile PR1, but after associating the plurality pairs of the color values $L_{D\text{-}D50}$, $a_{D\text{-}D50}$, $b_{D\text{-}D50}$ with the used amounts Dc, Dm, Dy, Dk of the first color material respectively for a part of the grid points G1, the used amounts Dc, Dm, Dy, Dk of the first color material for the remains of the grid points may be interpolated by the interpolation arithmetic operation. The printing color profile PR1 is used for generating, for example, the split LUT 230 of the "emphasis on color difference" and the original comprehensive LUT 210.

Further, when the color of each patch 362 is measured by using, for example, the R10 light source as the observation light source L0, and the plural pairs of the color values $L_{D\text{-}F10}$, $a_{D\text{-}F10}$, $b_{D\text{-}F10}$ are respectively associated with the used amounts Dc, Dm, Dy, Dk of the first color material, the printing color profile PR2 shown in FIG. 8 can be generated. When the color of each patch 362 is measured by using, for example, the F2 light source as the observation light source L0, and the plural pairs of the color values $L_{D\text{-}F2}$, $a_{D\text{-}F2}$, $b_{D\text{-}F2}$ are respectively associated with the used amounts Dc, Dm, Dy, Dk of the first color material, the printing color profile PR3 shown in FIG. 8 can be generated. Also, the interpolation arithmetic operation may be used for the generation of these printing color profiles PR2, PR3. The printing color profiles PR2, PR3 are used for generating, for example, the split LUT 230 of the "emphasis on visual effects" and the original comprehensive LUT 210.

(4-2) Example that Predicts Used Amount of the Second Color Material:

The LUT generating apparatus U0 can calculate the ink amount that the target color values for the number of the determined light sources are reproduced at the same time by the optimal quantity search method of the ink amount (optimization algorithm). The prediction section U13 predicts the used amounts of the CMYKlclm color material CL2 to approximate the color values of the CMYKlclm color material CL2 formed in the color reproduction image 160 to the target color values $L_D$, $a_D$, $b_D$ in each observation light source based on the evaluation value I that evaluates an approximation to the target color values $L_D$, $a_D$, $b_D$ specified in the printing color profile PR1 for the plurality of observation light sources L0.

Figure 10:
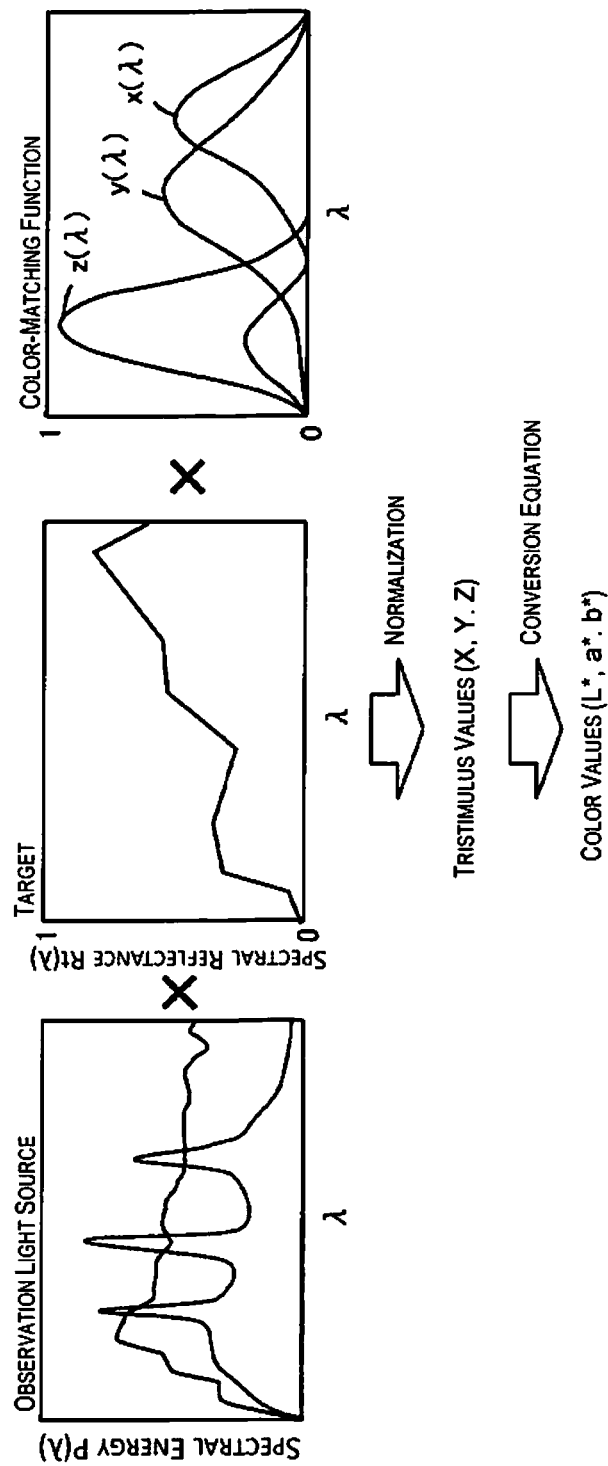
FIG. 10 is a diagram explaining a calculation example for calculating a color value based on a spectral reflectance.

FIG. 10 schematically exemplifies a condition that obtains the respective color values under the plurality of observation light sources from the target (patch) having a spectral reflectance. The spectral reflectance $R_t(\lambda)$ of the target normally has uneven distribution in the entire visible wavelength region. Each of the light sources has a different spectral energy $P(\lambda)$ distribution, respectively. The spectral energy of each reflected light wavelength when the light source is irradiated to the target is the value that the target spectral reflectance $R_t(\lambda)$ and the spectral energy $P(\lambda)$ are multiplied for each wavelength. In addition, the color matching functions $x(\lambda)$, $y(\lambda)$, $z(\lambda)$ corresponding to the human spectral sensitivity characteristics for the spectrum of the reflected light spectral energy are respectively convolution-integrated, and the normalization is performed by the coefficient k so that the tristimulus values X, Y, Z can be obtained.

[Equation (1)]

$$X = k\int P(\lambda) R_t(\lambda) x(\lambda) d\lambda$$

$$Y = k\int P(\lambda) R_t(\lambda) y(\lambda) d\lambda$$

$$Z = k\int P(\lambda) R_t(\lambda) z(\lambda) d\lambda \quad (1)$$

The color values L*a*b* can be obtained by converting the aforementioned tristimulus values X, Y, Z by the predetermined conversion equation.

As shown in FIG. 10, the spectrum of the spectral energy $P(\lambda)$ is different in each light source so that the finally obtained target color value is also different in response to the light source.

Figure 11:
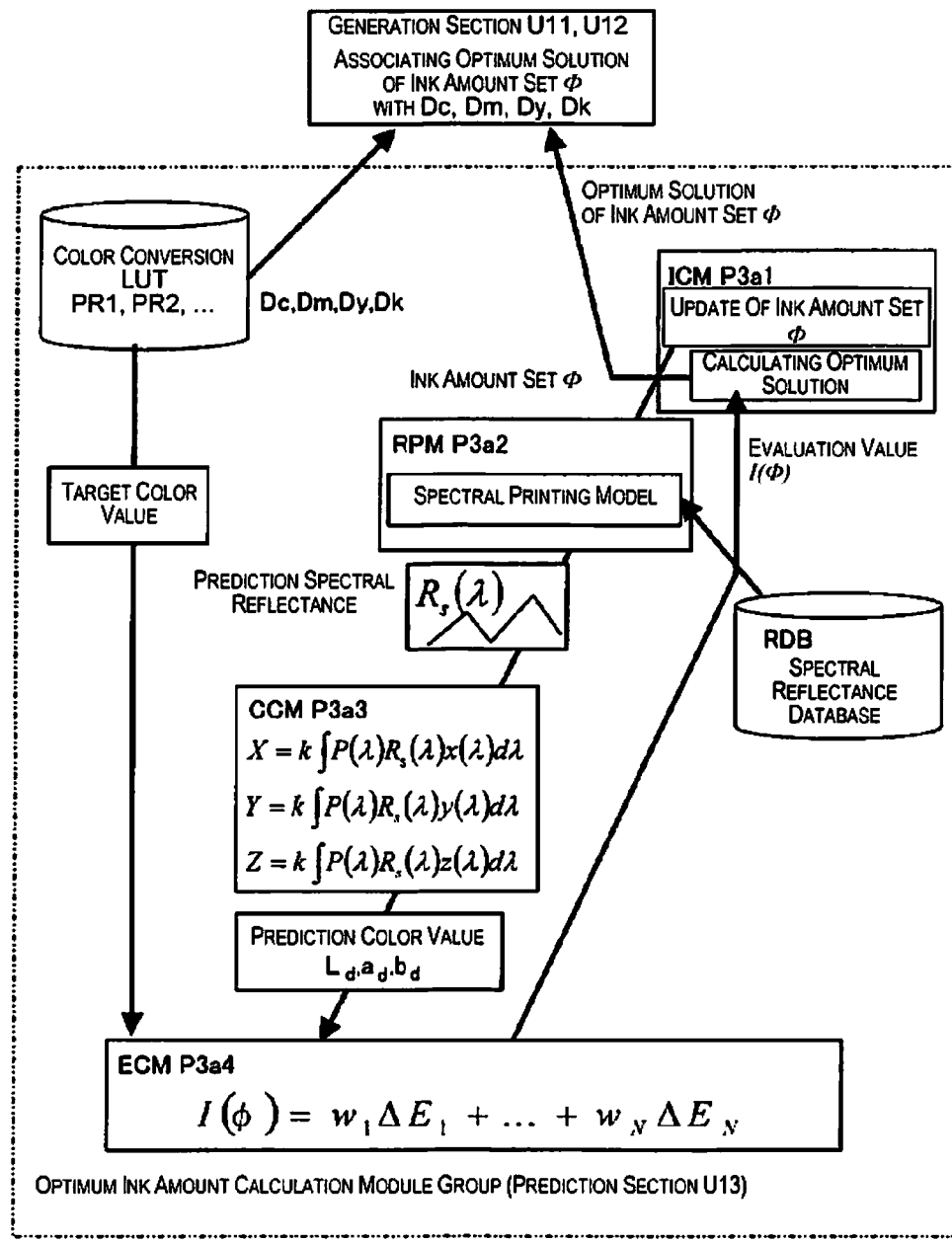
FIG. 11 is a diagram schematically exemplifying a flow of optimization process for an ink amount set.

FIG. 11 schematically exemplifies a flow of optimal ink amount calculation module group process for calculating the ink amount set $\phi$ that is capable of reproducing the colors, which are same color as the target color values $L_D$, $a_D$, $b_D$. When the second color material CL2 is the color materials of CMYKlclm, the ink amount set $\phi$ means the combination of the used amounts $d_c$, $d_m$, $d_y$, $d_k$, $d_{lc}$, $d_{lm}$ of the CMYKlclm inks to be ejected.

The optimal ink amount calculation module group (prediction section U13) is provided with an ink amount set calculation module (ICM) P3a1, a spectral reflectance prediction module (RPM) P3a2, a color calculation module (CCM) P3a3, and an evaluation value calculation module (ECM) P3a4.

The ink amount set calculation module (ICM) P3a1 selects one of the grid points G1 from the four-dimensional printing color profile PR0 that an input is the amounts of the used CMYK color materials, and the target color values $L_D$, $a_D$, by corresponding to the grid point G1 are acquired. At this point, this is significantly different from the printing system of JP Laid-open Patent Application Publication No. 2009-200820 that discloses an input as a RGB image output.

In response to the ink used amount set $\phi$ from ICM P3a1 that is specifically the input of the ink used amounts $d_c$, $d_m$, $d_y$, $d_k$, $d_{lc}$, $d_{lm}$, the spectral reflectance prediction module (RPM) P3a2 predicts the spectral reflectance $R(\lambda)$ as a prediction spectral reflectance $Rs(\lambda)$ when the proof device 100 ejects the ink to the printing material M2 such as a printing paper based on the ink amount set $\phi$. When the ink amount set $\phi$ is specified, the formation condition of each ink dot on the printing material M2 can be predicted so that the RPM P3a2 can uniquely calculate the prediction spectral reflectance $Rs(\lambda)$.

Figure 13:
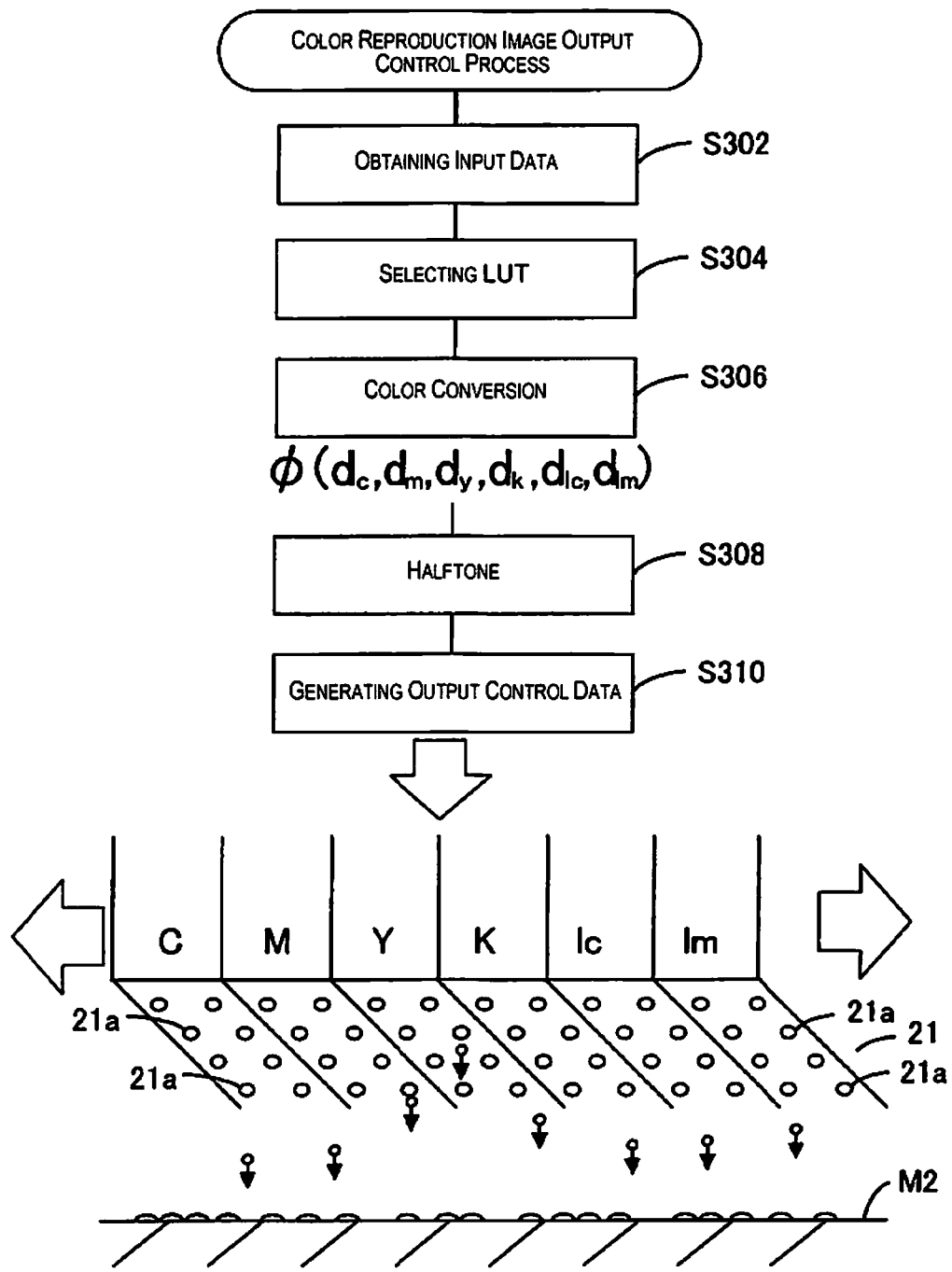
FIG. 13 is a flowchart exemplifying a color reproduction image output control process performed in an image-forming apparatus.

Here, a prediction model (spectral printing module) used for the RPM P3a2 will be described in reference to FIGS. 13 to 16. FIG. 13 schematically exemplifies the recording head 21 of the proof device 100. The recording head 21 is provided with a plurality of nozzles 21a in each ink of CMYKlclm. The proof device 100 controls the used amount of each ink of CMYKlclm to the ink amount set $\phi$ ($d_c$, $d_m$, $d_y$, $d_k$, $d_{lc}$, $d_{lm}$). The ink droplets ejected from each nozzle 21a become a collection of multiple dots on the printing material M2, and therefore, the color reproduction image 160, which is in the ink coating ratio in response to the ink amount set $\phi$ ($d_c$, $d_m$, $d_y$, $d_k$, $d_{lc}$, $d_{lm}$), is formed on the printing material M2.

The prediction model used for the RPM P3a2 (spectral printing module) predicts the spectral reflectance $R(\lambda)$ as a prediction spectral reflectance $Rs(\lambda)$ in the case that the printing is performed in given ink amount set $\phi$ ($d_c$, $d_m$, $d_y$, $d_k$, $d_{lc}$, $d_{lm}$). In the spectral printing module, the color patches for a plurality of representative points in the ink amount space are printed, and the spectral reflectance database RDB obtained by measuring the spectral reflectance $R(\lambda)$ by the spectral reflectance meter is prepared. By performing the prediction by the cell-division Yule-Nielsen spectral Neugebauer model (Cellular Yule-Nielsen Spectral Neugebauer Model) that the spectral reflectance database RDB is used, the prediction spectral reflectance $Rs(\lambda)$ when the printing is performed by the given ink amount set $\phi$ is accurately predicted.

Figure 14:
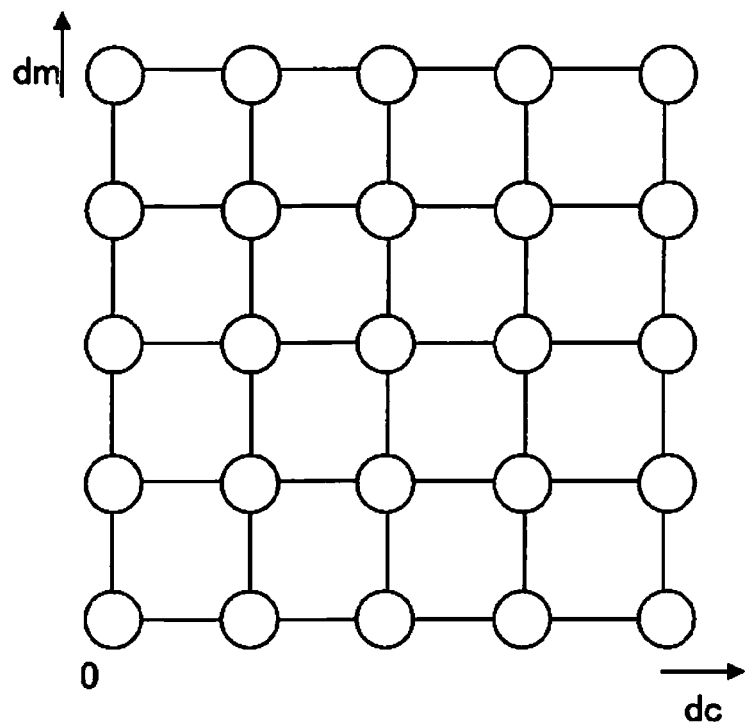
FIG. 14 is a diagram schematically exemplifying a configuration of a spectral reflectance database.

FIG. 14 schematically exemplifies a structure of the spectral reflectance database RDB. The ink amount space of the present embodiment is six-dimension, but only CM surface is drawn to simplify the drawing. The spectral reflectance database RDB is the LUT that the spectral reflectance $R(\lambda)$ obtained by actually printing and measuring the ink amount set ($d_c$, $d_m$, $d_y$, $d_k$, $d_{lc}$, $d_{lm}$) of the plurality of grid points in the ink amount space is disclosed. This LUT has the gird points that each ink amount axis is divided into multiple. Only a part of grid points may be actually printed and measured, and the spectral reflectance $R(\lambda)$ of other grid points may be predicted based on the spectral reflectance $R(\lambda)$ of the grid points that are actually printed and measured. Therefore, the number of color patches that the printing and the measurement are actually performed can be reduced.

The spectral reflectance database RDB is prepared in each kind of the printing materials. The spectral reflectance $R(\lambda)$ is determined based on the spectral transmittance of the ink film (dots) formed on the printing material and the reflectance of the printing material since the surface physical properties (dependent on the shape of dots) or the reflectance of the printing materials are greatly affected.

The RPM P3a2 executes a prediction by the cell-division Yule-Nielsen spectral Neugebauer model, that the spectral reflectance database RDB is used, in response to the request of the ICM P3a1. In this prediction, a prediction condition is acquired from the ICM P3a1, and this prediction condition is set. For example, the printing material or the ink amount set φ is set as a printing condition. When the prediction is performed for a glossy paper as a printing paper, the spectral reflectance database RDB provided by printing the color patches on the glossy paper is set.

When the spectral reflectance database RDB was set, the ink amount set $(d_c, d_m, d_y, d_k, d_{lc}, d_{lm})$ inputted from the ICM P3a1 is applied to the spectral printing module. The cell-division Yule-Nielsen spectral Neugebauer model is based on the well-known spectral Neugebauer model and Yule-Nielsen model. A model that three kinds of inks such as CMY are used is explained for simplicity, but the same model can be expanded to the model that the ink-set of CMYKlclm of the present embodiment is used. For the cell-division Yule-Nielsen spectral Neugebauer model, please see Color Res Appl 25, 4-19, 2000 and R Balasubramanian, Optimization of the spectral Neugebauer model for printer characterization, J. Electronic Imaging 8(2), 156-166 (1999).

Figure 15A:
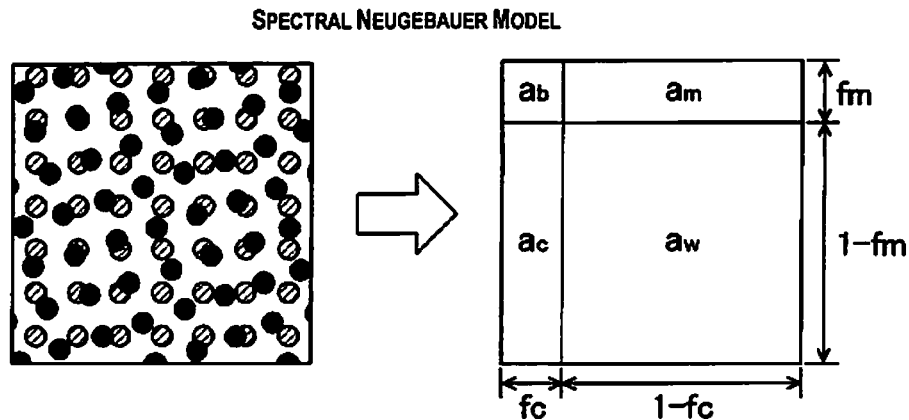
FIGS. 15A and 15B are diagrams schematically exemplifying a spectral Neugebauer model.

FIG. 15A schematically exemplifies the spectral Neugebauer model. In the spectral Neugebauer model, the prediction spectral reflectance $R_s(\lambda)$ of the print material when the printing is performed in the given ink amount set $(d_c, d_m, d_y)$ is given in the following equation.

[Equation (2)]

$$R_s(\lambda)=a_w R_w(\lambda)+a_c R_c(\lambda)+a_m R_m(\lambda)+a_y R_y(\lambda)+a_r R_r(\lambda)+a_g R_g(\lambda)+a_b R_b(\lambda)+a_k R_k(\lambda) \quad (2)$$

$$a_w=(1-f_c)(1-f_m)(1-f_y)$$

$$a_c=f_c(1-f_m)(1-f_y)$$

$$a_m=(1-f_c)f_m(1-f_y)$$

$$a_y=(1-f_c)(1-f_m)f_y$$

$$a_r=(1-f_c)f_m f_y$$

$$a_g=f_c(1-f_m)f_y$$

$$a_b=f_c f_m(1-f_y)$$

$$a_k=f_c f_m f_y$$

Here, $a_i$ is an area ratio of i-th region, and $R_i(\lambda)$ is the spectral reflectance of i-th region. Index i respectively means a region (w) where the ink is not existed, a region (c) where only cyan ink is existed, a region (m) where only magenta ink is existed, a region (y) where only yellow ink is existed, a region (r) where the magenta ink and the yellow ink are ejected, a region (g) where the yellow ink and the cyan ink are ejected, a region (b) where the cyan ink and the magenta ink are ejected, and a region (k) where the three CMY inks are ejected. Further, $f_c, f_m, f_y$ represent a ratio of an area coated by the ink when only one kind of the CMY inks is ejected (called as "ink coating ratio (ink region coverage)").

Figure 15B:
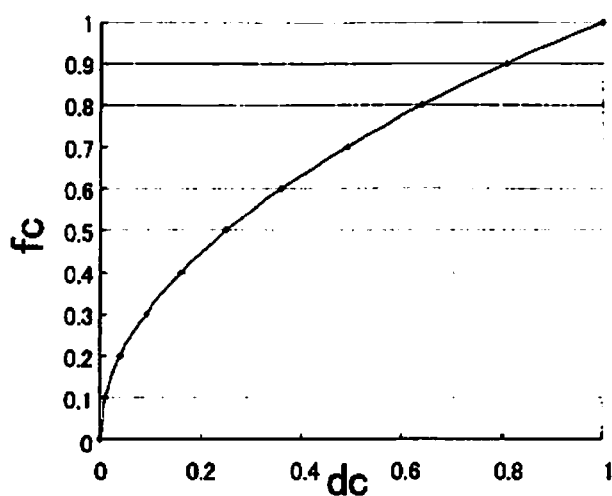

The ink coating ratios $f_c, f_m, f_y$ are given by Murray-Davis model shown in FIG. 15B. In the Murray-Davis model, for example, the ink coating ratio $f_c$ of the cyan ink is a nonlinear function of the cyan ink amount $d_c$, and for example, the ink coating ratio $f_c$ can be converted to the ink amount $d_c$ based on the one-dimension look-up table. The reason why the ink coating ratios $f_c, f_m, f_y$ become a nonlinear function of the ink amounts $d_c, d_m, d_y$ is because when small amount of the ink is ejected to a unit area, the ink is sufficiently spread, but when large amount of ink is ejected, the area covered by the ink does not increase much since the ink are overlapped. MY inks, which are other kinds of inks, are also the same as the above description.

When the Yule-Nielsen model related to the spectral reflectance is applied, the aforementioned Equation (2) is rewritten to the following Equation (3a) or Equation (3b).

[Equations (3a) and (3b)]

$$R_s(\lambda)^{1/n}=a_w R_w(\lambda)^{1/n}+a_c R_c(\lambda)^{1/n}+a_m R_m(\lambda)^{1/n}+a_y R_y(\lambda)^{1/n}+a_r R_r(\lambda)^{1/n}+a_g R_g(\lambda)^{1/n}+a_b R_b(\lambda)^{1/n}+a_k R_k(\lambda)^{1/n} \quad (3a)$$

$$R_s(\lambda)=\{a_w R_w(\lambda)^{1/n}+a_c R_c(\lambda)^{1/n}+a_m R_m(\lambda)^{1/n}+a_y R_y(\lambda)^{1/n}-a_r R_r(\lambda)^{1/n}+a_g R_g(\lambda)^{1/n}+a_b R_b(\lambda)^{1/n}+a_k R_k(\lambda)^{1/n}\} \quad (3b)$$

Here, n represents a predetermined coefficient more than or equal to 1, and for example, it can be set n=10. Equation (3a) or Equation (3b) is Equation representing the Yule-Nielsen spectral Neugebauer model (Yule-Nielsen Spectral Neugebauer Model).

The cell-division Yule-Nielsen spectral Neugebauer model (Cellular Yule-Nielsen Spectral Neugebauer Model) employed in the present embodiment is that the ink amount space of the aforementioned Yule-Nielsen spectral Neugebauer model is divided into a plurality of cells.

Figure 16A:
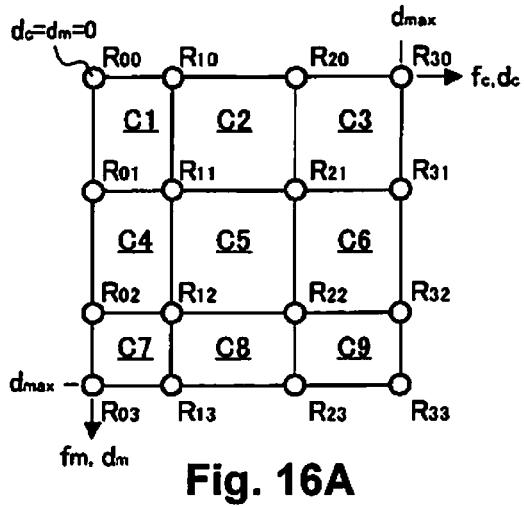
FIGS. 16A, 16B and 16C are diagrams schematically exemplifying a cell-division Yule-Nielsen spectral Neugebauer model.

FIG. 16A shows an example of cell-division in the cell-division Yule-Nielsen spectral Neugebauer model. Here, for simplicity, the cell division is drawn in the two-dimension ink amount space including two axes of the ink amounts $d_c, d_m$ of CM inks. The ink coating ratios $f_c, f_m$ are uniquely related with the ink amounts $d_c, d_m$ in the aforementioned Murray-Davis model so that it can be considered as axes indicating the ink coating ratios $f_c, f_m$. The white circles are the grid points of the cell division (called as "grid point"), and the two-dimension ink amount (coverage) space is divided to 9 cells C1 to C9. The ink amount set $(d_c, d_m)$ corresponding to each grid point is the ink amount set corresponding to the grid point specified in the spectral reflectance database RDB. That is, in reference to the aforementioned spectral reflectance database RDB, the spectral reflectance $R(\lambda)$ of each grid point can be obtained. Accordingly, the spectral reflectance $R(\lambda)_{00}$, $R(\lambda)_{10}$, $R(\lambda)_{20}$, $R(\lambda)_{33}$ of each grid point can be obtained from the spectral reflectance database RDB.

In the present embodiment, the cell division is performed in the six-dimension ink amount space of CMYKlclm, and the coordinate of each grid point is presented by the six-dimension ink amount set $\phi$ $(d_c, d_m, d_y, d_k, d_{lc}, d_{lm})$. The spectral reflectance $R(\lambda)$ of the grid point corresponding to the ink amount set φ of each grid point is obtained from the spectral reflectance database RDB (e.g., a coat paper).

FIG. 16A shows a relationship between the ink coating ratio $f_c$ and the ink amount $d_c$ used in the cell division model. Here, the range between 0 to $d_{cmax}$ of the ink amount of one kind of ink is divided into three sections, and a hypothetical ink coating ratio $f_c$ to be used in the cell division model by non-linear curve that monotonically increases from 0 to 1 in each section is calculated. For other inks, the ink coating ratios $f_m, f_y$ are calculated in the same manner.

Figure 16B:
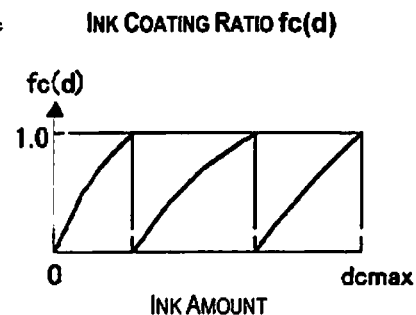
Figure 16C:
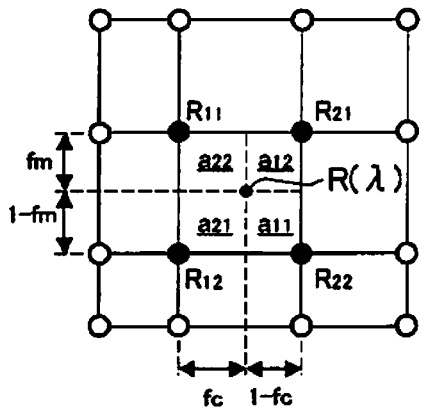

FIG. 16C shows a calculation method of the prediction spectral reflectance $R_s(\lambda)$ when the printing is performed by the given ink amount set $(d_c, d_m)$ within the middle of the cell C5 in FIG. 16A. The prediction spectral reflectance $R_s(\lambda)$ when the printing is performed by the ink amount set $(d_c, d_m)$ is given by the following equation.

[Equation (4)]

$$R_s(\lambda) = \left(\sum a_i R_i(\lambda)^{1/n}\right)^n \quad (4)$$
$$= (a_{11} R_{11}(\lambda)^{1/n} + a_{12} R_{12}(\lambda)^{1/n} + a_{21} R_{21}(\lambda)^{1/n} + a_{22} R_{22}(\lambda)^{1/n})^n$$
$$a_{11} = (1-f_c)(1-f_m)$$
$$a_{12} = (1-f_c)f_m$$
$$a_{21} = f_c(1-f_m)$$
$$a_{22} = f_c f_m$$

Here, the ink coating ratios $f_c$, $f_m$ in Equation (4) are the values given in the graph shown in FIG. 16B. Also, the spectral reflectance $R(\lambda)_{11}$, $(\lambda)_{12}$, $(\lambda)_{21}$, $(\lambda)_{22}$ corresponding to the four grid points surrounding the cell C5 can be obtained in reference to the spectral reflectance database RDB. Therefore, all of the values that configure the right side of Equation (4) can be determined so that the prediction spectral reflectance $R_s(\lambda)$ when the printing is performed by the given ink amount set ϕ ($d_c$, $d_m$) as the calculation result can be calculated. The prediction spectral reflectance $R_s(\lambda)$ in visible light region can be obtained by sequentially shifting the wavelength λ in the visible wavelength region. When the ink amount space is divided into a plurality of cells, the prediction spectral reflectance $R_s(\lambda)$ can be more accurately calculated in comparison with the case that it is not divided.

As described above, the RPM P3a2 predicts the prediction spectral reflectance $R_s(\lambda)$ in response to the request of the ICM P3a1.

When the prediction spectral reflectance $R_s(\lambda)$ is obtained, the color calculation module (CCM) P3a3 calculates prediction color values when the plurality of observation light sources L0 irradiates to an object of the prediction spectral reflectance Mk). In this prediction color values, for example, L*a*b* of the CIE L*a*b* color space are used. The flow of the calculation of the prediction color values is provided in the same manner as shown in FIG. 10 and the aforementioned Equation (1).

[Equation (5)]

$$X = k\!\int\! P(\lambda) R_s(\lambda) x(\lambda) d\lambda$$
$$Y = k\!\int\! P(\lambda) R_s(\lambda) y(\lambda) d\lambda$$
$$Z = k\!\int\! P(\lambda) R_s(\lambda) z(\lambda) d\lambda \quad (5)$$

As shown in Equation (5), the spectrum of the spectral energy of each light source is multiplied to the prediction spectral reflectance $R_s(\lambda)$, and the convolution-integration is performed by the color matching function, and the prediction color values $L_d$, $a_d$, $b_d$ are calculated by converting the tristimulus value to L*a*b* values. The prediction color values are calculated in each of the observation light sources L0.

The evaluation value calculation module (ECM) P3a4 calculates the color difference ΔE between the target color values $L_D$, $a_D$, $b_D$ and the prediction color values $L_d$, $a_d$, $b_d$ for each observation light source. The color difference may be calculated by $\Delta E = \{(L_d - L_D)^2 + (a_d - a_D)^2 + (b_d - b_D)^2\}^{1/2}$, or it may be calculated based on the color difference equation ($\Delta E_{2000}$) of CIE DE2000. When the D50, D65, A light sources are selected as the observation light source L0, the color difference of each light source is indicated as $\Delta E_{D50}$, $\Delta E_{D65}$, $\Delta E_A$. The evaluation value I (ϕ) that evaluates an approximation to the target color values $L_D$, $a_D$, $b_D$ by is the evaluation function that is dependent on the ink used amounts $d_c$, $d_m$, $d_y$, $d_k$, $d_{lc}$, $d_{lm}$, and for example, it can be calculated by the following equation.

[Equation (6)]

$$I(\phi) = \frac{\sum_{i=1}^{N}(w_i \Delta E_i)}{N} \quad (6)$$

Here, i represents the observation light source. In the aforementioned example, i=1 represents D50 light source, i=2 represents D65 light source, and i=3 represents A light source. N represents the number of selected observation light sources. $\Delta E_i$ represents the color difference between the target color values $L_D$, $a_D$, $b_D$ and the prediction color values $L_d$, $a_d$, $b_d$ under the observation light source i. $w_i$ represents a weight for the color difference ΔE; under each observation light source. In the present embodiment, it is explained in the manner that the weight $w_i$ is equal, but it may not be equal.

There is a characteristic that as each color difference $\Delta E_i$ is reduced, the evaluation value I (ϕ) becomes smaller, and as the target color values and the prediction color values are comprehensively closer in each observation light source, it becomes smaller. The ICM P3a1 outputs the ink amount set ϕ to the RPM P3a2, the CCM P3a3, and the ECM P3a4 so that the evaluation value I (ϕ) is eventually repeated to the ICM P3a1. The ICM P3a1 repeats to calculate the evaluation value I (ϕ) corresponding to the ink amount set ϕ so that an optimized solution of the ink amount set ϕ that the evaluation value I (ϕ) as an object function minimizes is calculated. As the method for calculating the optimized solution, for example, the nonlinear optimization method such as a gradient method can be used.

Figure 12:
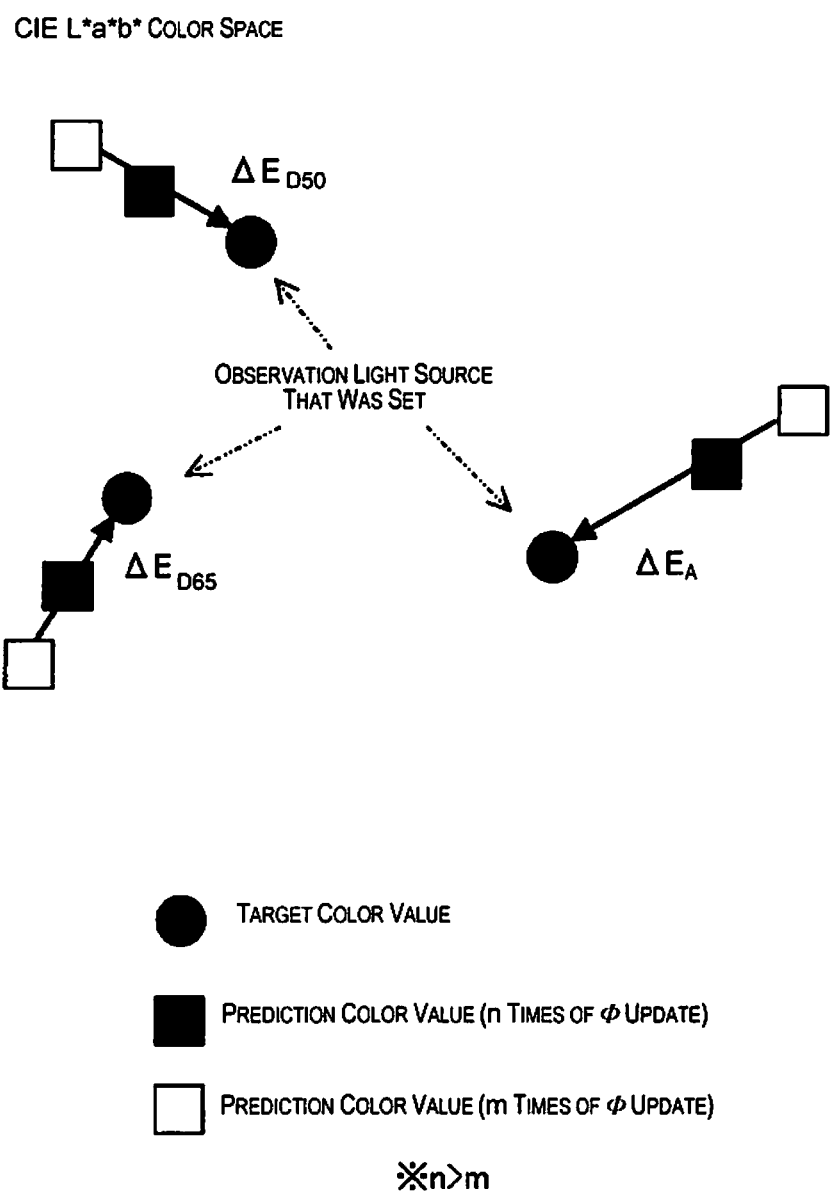
FIG. 12 is a diagram schematically exemplifying a condition that the ink amount set is optimized.

FIG. 12 indicates the changes of the prediction color values $L_d$, $a_d$, $b_d$ under each observation light source when the target color values $L_D$, $a_D$, $b_D$ and the ink amount set ϕ are optimized under each observation light source in the CIE L*a*b* color space. The ink amount set ϕ ($d_c$, $d_m$, $d_y$, $d_k$, $d_{lc}$, $d_{lm}$) are optimized so that each color difference ΔE, is gradually reduced. Therefore, the ink amount set ϕ capable of reproducing the colors of the color values, which are close to the target color values $L_D$, $a_D$, $b_D$, to the color reproduction image 160 in each observation light source is calculated.

A termination condition of the optimization process can be, for example, when the color difference $\Delta E_i$ is less than or equal to the threshold value $TE_i$. The threshold value $TE_i$ is provided in each observation light source i, and it may be the same value each other, or it may be different value. When it becomes $\Delta E_i \leq TE_i$ for all of the observation light source i, the optimization process is completed. Therefore, the prediction section U13 predicts the used amount of the second color material CL2. The original comprehensive LUT generating section U11 generates the original comprehensive LUT 210 that associates the predict used amounts $d_c$, $d_m$, $d_y$, $d_k$, $d_k$, $d_{lm}$ of the second color material CL2 in the comprehensive region R9 of the input color space with the used amounts Dc, Dm, Dy, Dk of the first color material CL1. The split LUT generating section U12 generates the split LUT 230 that associates the predict used amounts $d_c$, $d_m$, $d_y$, $d_k$, $d_{lc}$, $d_{lm}$ of the second color material CL2 in the partial region R0 of the input color space with the used amounts Dc, Dm, Dy, Dk of the first color material CL1.

When the following detailed example is explained, the original comprehensive LUT 210 has an output characteristic that matches the color tones of the print image 360 and the color reproduction image 160 under the multiple observation light sources (e.g., D50, D55, D65, A F11 light source). In this case, the color difference $\Delta E_{D50}$ under the D50 light source may be smaller than the color difference under other light sources. Further, the slit LUT 230 for the first region R1 (referred to as the first LUT 241) has the first output characteristic of the emphasis on visual effects that matches with the color tones of the both images 360, 160 under the F10, F2 light sources, and the split LUT 230 for the second region R2 (referred to as the second LUT 242) has the second output characteristic of the emphasis on color difference that matches with the color tones of the both images 360, 160 under the D50 light source. In this case, the F10, F2 light source is the first observation light source, and the D50 light source is the second observation light source. The threshold values $TE_1$, $TE_2$ with respect to the color differences $\Delta E_1$, $\Delta E_2$ under F10, F2 light sources are defined as $TE_1=TE_2$ that indicates the mixing ratio of 1:1.

Figure 17:
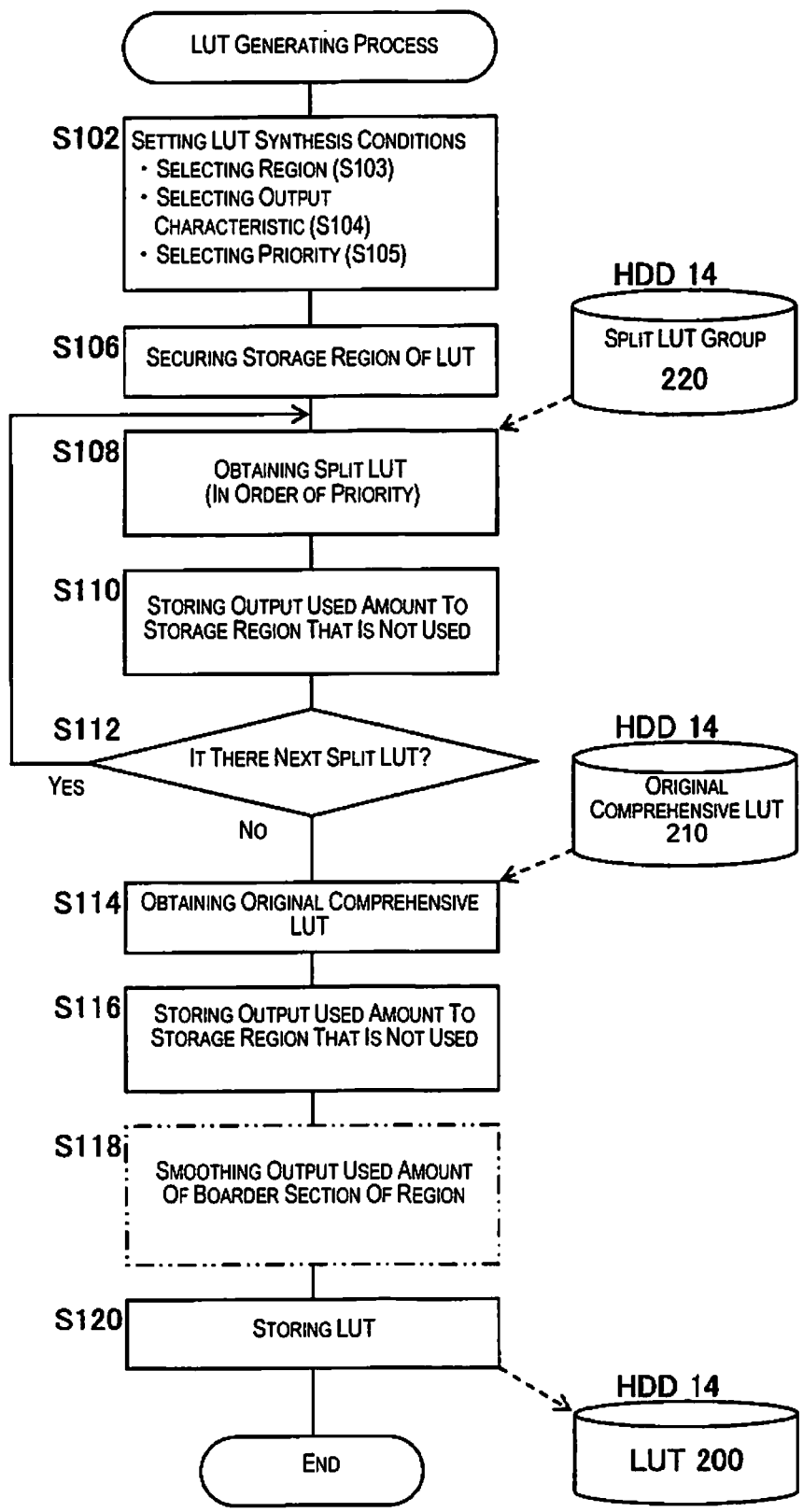
FIG. 17 is a flowchart exemplifying a look-up table generating process.

(4-3) Example for Generating Look-Up Table:

FIG. 17 exemplifies a flowchart of the LUT generating process performed in the computer 10 (LUT generating apparatus U0). When the LUT generating process starts, the computer 10 receives the condition setting of the LUT synthesis (Step S102. Hereinafter, the description of "Step" is omitted).

Figure 18:
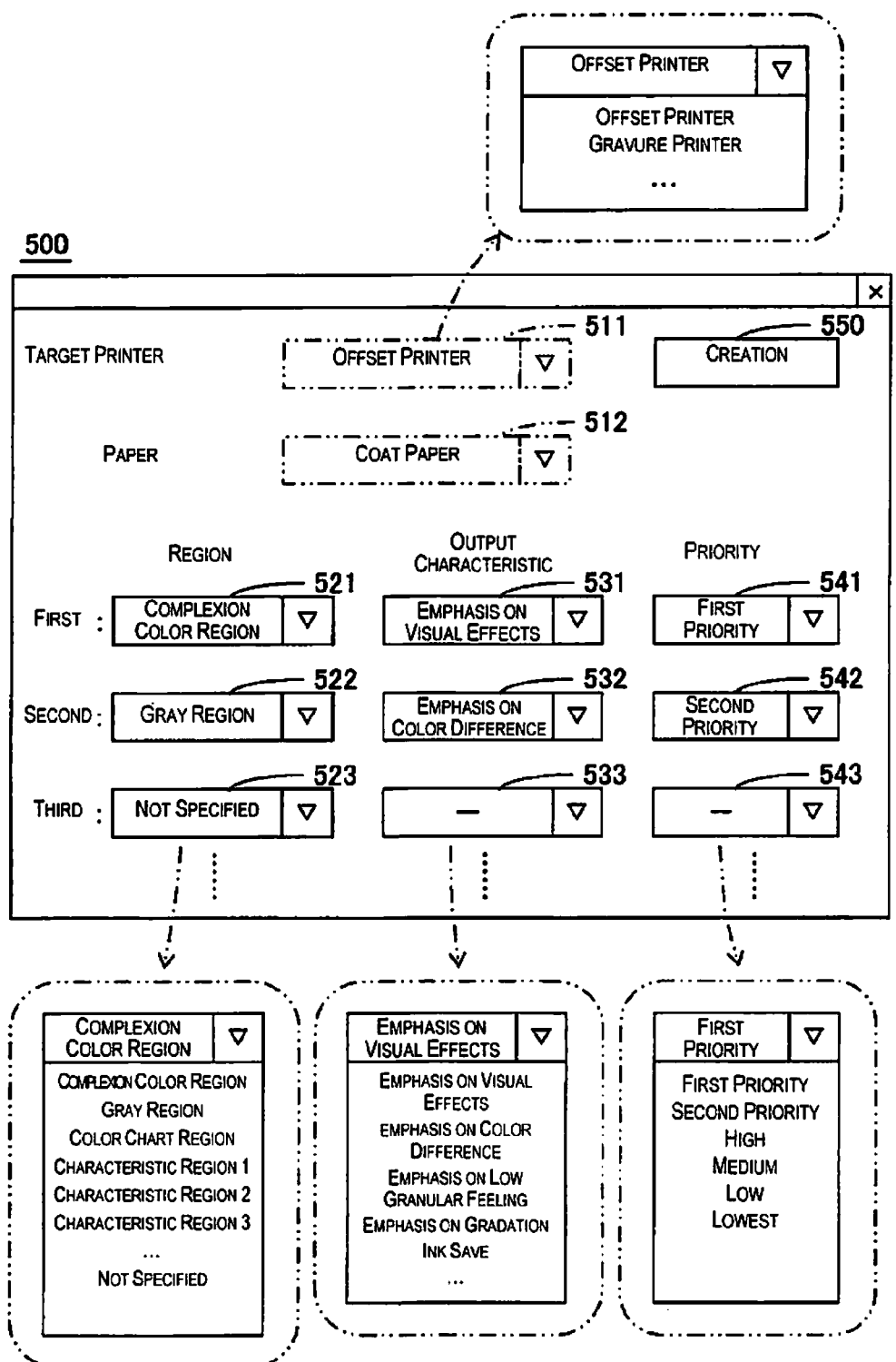
FIG. 18 is a diagram schematically exemplifying a setting screen 500.

FIG. 18 exemplifies a setting screen 500 that displays a display 40 by the computer 10. In the setting screen 500, the selection fields 521, 522, 523, . . . of the regions R0 included in the CMYK color space, the selection fields 531, 532, 533, . . . of the output characteristics, the selection fields 541, 542, 543, . . . of the priorities, the creation button 550, etc. are provided. The final generating LUT 200 is matched with the type of the printer body 300, and it is matched with the type of the printing material M1 so that a type selection field 511 of the printing body 300, a type selection filed 512 of the printing material M1, etc. may be provided in the setting screen 500.

In the selection field 511 of the printer body, it is capable of inputting a selection of a type of the printer body among the plurality of items such as an offset printer, a gravure printer, etc. In the selection filed 512 of the printing materials, it is capable of inputting a selection of a type of the printing material among the plurality of items such as a coat paper, a Kent paper, etc.

In the region selection fields 521, 522, 523, it is capable of inputting a selection of the region R0 of the split LUT 230 among the items such as a complexion color region, a gray region, a color chart region, a characteristic region, not-specified, etc. The phrase "not-specified" means that the split LUT 230 used for the synthesis of the LUT 200 is not specified. In the region selection fields other than "not-specified", the different regions are selected each other. A process for storing an item selected by receiving a control input to the region selection field is the process of S103 that receives an input to select the region R0 included in the input color space.

In the output characteristic selection fields 531, 532, 533, . . . , it is capable of inputting a selection of the output characteristic corresponding to the region R0 among the items such as emphasis on visual effect, emphasis on color difference, emphasis on low granular feeling, emphasis on gradation, ink save, etc. In the example of FIG. 18, it shows that the emphasis on visual effects is associated with the complexion color region, and the emphasis on color difference is associated with the gray region. In the region selection filed, the different regions are selected each other so that the same type of output characteristic may be selected in the output characteristic selection field. A process for storing an item selected by receiving a control input to the output characteristic selection filed is the process of S104 that receives an input to select the output characteristic associated with the region R0.

In the priority selection fields 541, 542, 543, . . . , it is capable of inputting a selection of the priorities corresponding to the region R0 among the items such as the first priority, the second priority, high, medium, low, the lowest priority, etc. In the example of FIG. 18, it shows that the "first priority" is associated with the complexion color region, and the "second priority" is associated with the gray region. In the first priority selection field, the different priorities are selected each other. A process for storing a priority selected by receiving a control input to the priority selection filed is the process of S105 that receives an input to select a priority associated with the region R0.

When the creation button 550 is operated, the computer 10 secures a storage region of the used amounts of the color materials $d_c$, $d_m$, $d_y$, $d_k$, $d_{lc}$, $d_{lm}$ of the LUT 200 in the RAM 12 (S106). In S108 to S112, regarding the region R0 that is selected in the region selection filed, the split LUT 230 that specifies the correspondence relationship between the color materials CL1, CL2 to indicate the output characteristic that was selected in the output characteristic selection field is selected from the split LUT group 220, and the selected split LUT 230 is synthesized. The index value such as the color difference $\Delta E$, etc. is associated with each split LUT 230 so that the split LUT 230 that satisfies the output characteristic selected in the output characteristic selection filed may be obtained by searching from the LUT group 220.

First, in S108, the split LUT 230 that indicates the output characteristic selected in the output characteristic selection field for the region R0 associated with the first priority selected in the priority selection field among the regions R0 that does not perform the used amounts of the color materials storage process of S110 by selecting in the region selection field is obtained from the split LUT group 220. In S110, the used amounts of the color materials $d_c$, $d_m$, $d_y$, $d_k$, $d_k$, $d_{lm}$ of the spilt LUT 230 obtained in S108 are stored for the grid point that does not store the used amounts of the color materials $d_c$, $d_m$, $d_y$, $d_k$, $d_k$, $d_{lm}$ of another split LUT 230 in the LUT storage region among the grid points that convert the colors within the region R0 of the split LUT 230 obtained in S108. In the example of FIG. 18, the split LUT 231 that corresponds to the combination of the complexion color region and the emphasis on visual effects in the beginning of the S108 process (see FIG. 5) is obtained, and the used amounts of the color materials $d_c$, $d_m$, $d_y$, $d_k$, $d_k$, $d_{lm}$ of the split LUT 231 in the beginning of the S110 process are stored in the grid point that convers the colors of the first region R1 within the LUT storage region.

In S112, it determines whether or not there is the split LUT 230 that does not store the used amounts of the color materials $d_c$, $d_m$, $d_y$, $d_k$, $d_k$, $d_{lm}$ among the split LUTs 230 that correspond to the combination of the region R0 and the output characteristic selected in the setting screen 500. When there is such split LUT 230, the processes between S108 to S112 are repeated. In the example of FIG. 18, the split LUT 232 that corresponds to the combination of the gray region and the emphasis on color difference (see FIG. 5) is obtained in the second time of the S108 process, and in the second time of S110 process, the used amounts of the color materials $d_c$, $d_m$, $d_y$, $d_k$, $d_{lc}$, $d_{lm}$ of the split LUT 232 are stored in the grid point that converts the colors of the second region R2 within the LUT storage region. Further, in the example of FIG. 18, when the used amounts of the color materials $d_c$, $d_m$, $d_y$, $d_k$, $d_{lc}$, $d_{lm}$ of the split LUT 232 are stored in the LUT storage region, the process proceeds to S114.

There is a overlapped region Rov of the regions R0 such as the regions R0A, R0D shown in FIG. 6A, and when the priority of the region R0A (the first region) is set higher than the priority of the region R0D (the second region), the LUT 200 indicating the first output characteristic, which is the same as the first region R0A, is selected for the overlapped region Rov. That is, when the first LUT indicating the first output characteristic for the first region R0A and the second LUT indicating the second output characteristic for the second region R0D are synthesized, in the obtained LUT 200, the first output characteristic is indicated for the region R0A included in the overlapped region Rov, and the second output characteristic is indicated for the region other than the overlapped region Rov from the region R0D. Therefore, the color reproduction target intended by the user can be suitably realized.

In S114, the original comprehensive LUT 210 is obtained from the HDD 14. In S116, the used amounts of the color materials $d_c$, $d_m$, $d_y$, $d_k$, $d_{lc}$, $d_{lm}$ of the original comprehensive LUT 210 are stored for the grid point that the used amounts of the color materials $d_c$, $d_m$, $d_y$, $d_k$, $d_{lc}$, $d_{lm}$ of the split LUT 230 are not stored in the LUT storage region within the comprehensive region R9 of the original comprehensive LUT 210. In the example of FIG. 18, the used amounts of the color materials $d_c$, $d_m$, $d_y$, $d_k$, $d_{lc}$, $d_{lm}$ of the original comprehensive LUT 210 in the grid points of the LUT storage region other than the grid points that convert the complexion color region and the color of the gray region from the comprehensive region R9 are stored.

In S118, the used amounts of the color materials $d_c$, $d_m$, $d_y$, $d_k$, $d_k$, $d_{lm}$ specified in the boundary section Rb of the region R0 in the CMYK color space are smoothed. The smoothing process of S118 is an arbitrary processing so that it may be omitted.

Figure 19:
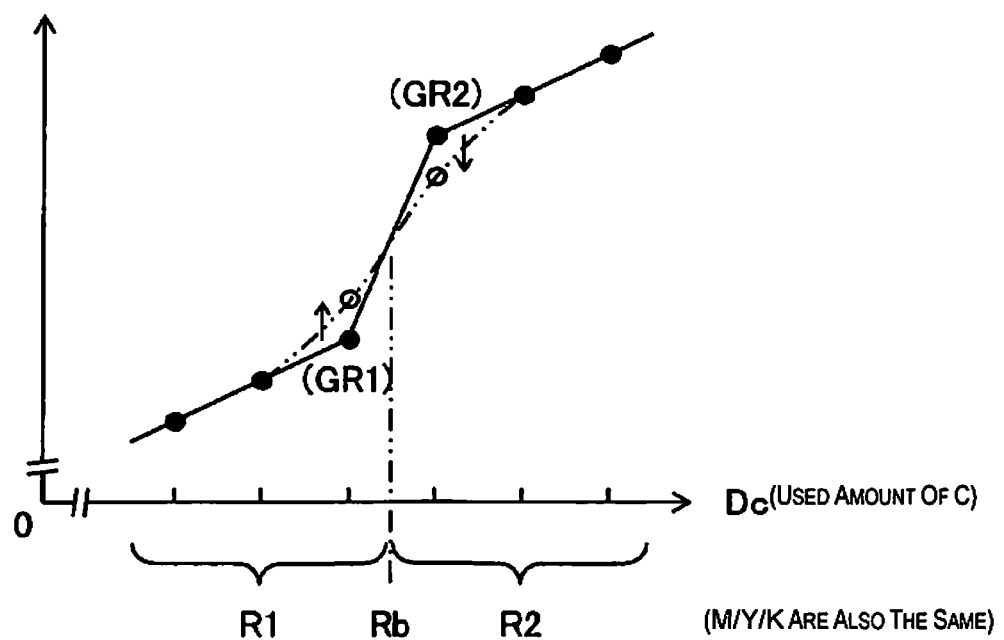
FIG. 19 is a diagram schematically exemplifying a smoothing process.

FIG. 19 schematically exemplifies the aforementioned smoothing process. For simplicity, the lateral axis indicates the input used amount Dc of C in the CMYK color space, that is, the coordinate of C of the grid points, and the vertical axis indicates the output used amount $d_c$ of c of the cmyklclm color space, that is, the used amount of the second color material CL2 of c stored in the grid points. Needless to say, it is possible to apply the input used amounts Dm, Dy, Dk of M, Y, K of the CMYK color space to the lateral axis, and it is possible to apply the output used amounts $d_m$, $d_y$, $d_k$, $d_{lc}$, $d_{lm}$ of m, y, k, lc, lm of the cmyklclm color space to the vertical axis. In the example of FIG. 19, it shows that the output used amount $d_c$ in the grid points GR1 within the first region R1, and the output used amount $d_c$ in the grid points GR2 within the second region R2 are not smoothly connected in the boundary section Rb. In this case, when the output used amounts Dc, $d_c$ of the grid points GR1, GR2 are smoothed and are smoothly connected, the image quality of the color reproduction image 160 can be improved.

In the smoothing process, for example, the approximation function f that calculates the used amount of the second color material CL2 corresponding from the used amount of the first color material CL1 is calculated by the least-square method, etc., and it can be a process that the used amount of the second color material CL2 is replaced to the value of the function f. The smoothing process may be performed according to color such as the output used amount $d_c$ with respect to the input used amount Dc, the output used amount $d_m$ with respect to the input used amount Dm, the output used amount $d_y$ with respect to the input used amount Dy, the output used amount $d_k$ with respect to the input used amount Dk, etc. Further, without using the function f, a process for changing the used amount (e.g., $d_c$) of the second color material CL2 of the boundary section Rb may be performed so as to eliminate variations for the change of the used amount (e.g., $d_c$) of the second color material CL2 with respect to the change of the used amount (e.g., Dc) of the first color material CL1 as much as possible.

When the used amount of the second color material CL2 specified to the boundary section Rb of the region R0 is smoothed, the color reproduction target intended by the user suitably realized.

The smoothing process may not have to be performed to the boundary sections Rb for all of the region R0 provided in the LUT 200, and for example, it may be performed only the boundary section of the first region R1, or it may be performed only the boundary section of the second region R2.

When the used amounts $d_c$, $d_m$, $d_y$, $d_k$, $d_{lc}$, $d_{lm}$ of the second color material CL2 are stored in the LUT storage region, it means that the LUT 200 was generated. The computer 10 stores the LUT 200, which stored in the RAM 12, in the HDD 14 (S120), and then ends the LUT generating process.

It is possible to arbitrarily change the aforementioned processes such as changing the order, etc. For example, after all of the used amounts $d_c$, $d_m$, $d_y$, $d_k$, $d_{lc}$, $d_{lm}$ of the color materials of the original comprehensive LUT 210 were stored in the LUT storage region, the output used amount of the grid points, which converts the color of the region R0 of the lowest priority of the split LUT 230 among the selected split LUTs 230, is replaced to the output used amount of the lowest priority of the split LUT 230, and after that, the output used amount of the grid points, which converts the color of the region R0 of the split LUTs 230 in the order of lower priority, may be replaced to the output used amount of the split LUT 230. In this way, the output characteristic, which is the same as the higher priority of the split LUT 230, is also obtained for the overlapped region Rov.

As shown in FIG. 3, the LUT 200 generated in accordance with the aforementioned specific example specifies the correspondence relationship indicating the "emphasis on visual effects" (first output characteristic) for the complexion color region (first region R1) included in the CMYK color space, and specifies the correspondence relationship indicating the "emphasis on color difference" (second output characteristic), which is different from the "emphasis on visual effects", for the gray region (second region R2), which is different from the complexion color region included in the CMYK color space. The output used amounts $d_c$, $d_m$, $d_y$, $d_k$, $d_{lc}$, $d_{lm}$ of the grid points, which convert the color of the complexion color region (R1), are based on the output used amount specified in the split LUT 231 such as the output used amount itself specified in the split LUT 231 (first LUT 241) of the "emphasis on visual effects" shown in FIG. 5, etc. The output used amounts $d_c$, $d_m$, $d_y$, $d_k$, $d_k$, $d_{lm}$ of the grid points, which convert the color of the gray region (R2), are based on the output used amount specified in the split LUT 232 such as the output used amount itself specified in the split LUT 232 (second LUT 242) of the "emphasis on color difference" shown in FIG. 5, etc. In the case of the overlapped region Rov, the output used amounts $d_c$, $d_m$, $d_y$, $d_k$, $d_{lc}$, $d_{lm}$ of the grid points of the overlapped region Rov are based on the output used amount specified in, for example, the first LUT 241 which is the higher priority.

The "emphasis on visual effects" split LUT 231 for the complexion color region (R1) has the first output characteristic that the color difference $\Delta E_{F10\text{-}F2}$ between the color value of the print image 360 and the color value of the color reproduction image 160 under the F10, F2 light sources, which are the ratio of 1:1, is less than or equal to positive threshold value TH1 (within the first range). The "emphasis on color difference" split LUT 232 for the gray region (R2) has the second output characteristic that the color difference $\Delta E_{D50}$ between the color values of the both images 360, 160 under the D50 light source is less than or equal to positive threshold value TH2 (within the second range). The threshold values TH1, TH2 are not specifically limited, but for example, it may be approximately 1.0 to 2.0, or it may be a different value. The first range includes $\Delta E_{F10\text{-}F2} \leq TH1$, and the second range includes $\Delta E_{D50} < TH2$.

In the complexion color region (R1), as a result that $\Delta E_{F10\text{-}F2} \leq TH1$ is emphasized for each of the grid points G2, G3, there exists a grid point that becomes $\Delta E_{D50} > TH2$ (outside of the second range). However, it may partially exist a grid point that becomes $\Delta E_{D50} \leq TH2$ (within the second range). In the gray region (R2), as a result that $\Delta E_{D50} \leq TH2$ is emphasized for each of the grid points G2, G3, there exists a grid point that becomes $\Delta E_{F10\text{-}F2} > TH1$ (within the first range). However, it may partially exist a grid point that becomes $\Delta E_{F10\text{-}F2} > TH1$ (within the first range).

From the above, as shown in FIG. 3, the output used amounts $d_c, d_m, d_y, d_k, d_k, d_{lm}$ of the complexion color region (R1) included in the LUT 200 are set to be $\Delta E_{F10\text{-}F2} \leq TH1$ (within the first range) indicating the first output characteristic, and at least a part is set to be $\Delta E_{D50} > TH2$ (outside of the second range). The output used amounts $d_c, d_m, d_y, d_k, d_k, d_{lm}$ of the gray region (R2) included in the LUT 200 are set to be $\Delta E_{D50} \leq TH2$ (within the second range) indicating the second output characteristic, and at least a part is set to be $\Delta F_{F10\text{-}F2} > TH1$ (outside of the first range).

As described above, for example, one of the LUTs 200 specifies the correspondence relationship indicating the output characteristic of "emphasis on visual effects" for the complexion color region (R1) within the CMYK color space, and specifies the correspondence relationship indicating the output characteristic of "emphasis on color difference" for the gray region (R2) within the CMYK color space. Accordingly, the color reproduction target intended by the user is realized in each region R0 of the CMYK color space by one of the LUTs 200 that specifies the correspondence relationship between the used amounts Dc, Dm, Dy, Dk of the color materials matching with the color material CL1 of CMYK of the printer body 300 and the used amounts $d_c, d_m, d_y, d_k, d_k, d_{lm}$ of the color materials matching with the color material CL2 of cmyklclm of the proof device 100.

The output characteristic means an overall output trend within the region R0. Therefore, an average such as an arithmetic average of the color difference $\Delta E_{F10\text{-}F2}$ between the print image 360 and the color reproduction image 160 of the colors in the multiple portions of the complexion color region (R1) included in the split LUT 230 and the LUT 200 may be set to be less than or equal to the positive threshold value TH1' (within the first range), and an average of the color difference $\Delta E_{D50}$ of the both images 360, 160 may be set to be larger than the positive threshold value TH2' (outside of the second range). Also, an average such as an arithmetic average of the color difference $\Delta E_{D50}$ between the both images 360, 160 of the colors in the multiple portions of the gray region (R2) included in the split LUT 230 and the LUT 200 may be set to be less than or equal to the threshold value TH2' (within the second range), and an average of the color difference $\Delta E_{F10\text{-}F2}$ of the both images 360, 160 may be set to be larger than the threshold value TH1' (outside of the first range).

(4-4) Example of Forming Color Reproduction Image:

FIG. 13 exemplifies a color reproduction image output control process performed in the proof device (image-forming apparatus) 100 stored in the aforementioned LUT 200. For example, this process starts when the proof device 100 received a formation request of the color reproduction image 160.

When the process starts, the proof device 100 obtains the input data corresponding to the used amount Dc, Dm, Dy, Dk of the color material CL1 of CMYK used for the formation of the print material 350 in the printer body 300 (S302). If necessary, in S304, the LUT 200 that is used for the color conversion process is selected.

In S306, the data of the used amounts Dc, Dm, Dy, Dk of the color materials of CMYK are converted to the data of the used amounts $d_c, d_m, d_y, d_k, d_k, d_{lm}$ of the color material CL2 of CMYLlclm used for the formation of the color reproduction image 160 in the proof device 100 in reference to the LUT 200. In the case that there is no input point in the LUT 200 corresponding to the used amounts Dc, Dm, Dy, Dk of the color materials, the used amounts $d_c, d_m, d_y, d_k, d_k, d_{lm}$ corresponding to the used amounts Dc, Dm, Dy, Dk may be interpolated by using the used amounts $d_c, d_m, d_y, d_k, d_k, d_{lm}$ of the color materials of CMYLlclm respectively corresponding to the a plurality of input points, which are adjacent to the used amounts Dc, Dm, Dy, Dk of the color materials in the CMYK color space. Therefore, the used amounts Dc, Dm, Dy, Dk of the color materials of CMYK can be converted to the used amounts $d_c, d_m, d_y, d_k, d_k, d_{lm}$ of CMYLlclm in accordance with the LUT 200.

In S308, the halftone process is performed for the data of the used amounts $d_c, d_m, d_y, d_k, d_k, d_{lm}$ of the color materials, and the multivalued data that indicates the formation condition of dots corresponding to the used amounts $d_c, d_m, d_y, d_k, d_{lm}$ is generated. As the halftone process, a dither method, an error diffusion method, a density pattern method, etc. can be used. In S310, the output control data is generated by allocating the multivalued data, which indicates the formation condition of the obtained dots, to each scan path and each nozzle 21a of the recording head 21. The recording head 21 forms ink dots to the printing material M2 in accordance with the aforementioned output control data, and forms the proof 150 having the color reproduction image 160.

Here, the color values obtained by measuring the colors of the print image 360 by the colorimetric device under the F10, F2 light sources, which are the ratio of 1:1, are $L_{D1}, a_{D1}, b_{D1}$, and the color values obtained by measuring the colors of the color reproduction image 160 by the colorimetric device under the F10, F2 light sources, which are the ratio of 1:1, are defined as $L_{d1}, a_{d1}, b_{d1}$. For the first region R1 of the both images 360, 160 (e.g., complexion color region), the color difference $\Delta E_{F10\text{-}F2}$ calculated from $L_{D1}, a_{D1}, b_{D1}$ and $L_{d1}, a_{d1}, b_{d1}$ becomes less than or equal to the TH1 (within the first range). For the second region R2 of the both images 360, 160 (e.g., gray region), at least a part of the color difference $\Delta E_{F10\text{-}F2}$ becomes more than or equal to the TH1 (outside of the first range).

Further, the color values obtained by measuring the colors of the print image 360 by the colorimetric device under the D50 light source are $L_{D2}, a_{D2}, b_{D2}$, and the color values obtained by measuring the colors of the color reproduction image 160 by the colorimetric device under the D50 light sources are defined as $L_{d2}, a_{d2}, b_{d2}$. For the second region R2 of the both images 360, 160 (e.g., gray region), the color difference $\Delta E_{D50}$ calculated from $L_{D2}$, $a_{D2}$, $b_{D2}$ and $L_{d2}$, $a_{d2}$, $b_{d2}$ becomes less than or equal to the TH2 (within the second range). For the first region R1 of the both images 360, 160 (e.g., complexion color region), at least a part of the color difference $\Delta E_{D50}$ becomes more than or equal to the TH2 (outside of the second range).

As described above, in one of the LUTs 200, the correspondence relationship indicating the first output characteristic for the first region R1 in the input color space is specified, and the correspondence relationship indicating the second output characteristic, which is different from the first output characteristic, for the second region R2 in the input color space is specified. Accordingly, the present technology can realize the color reproduction target intended by the user in each region R0 of the input color space by one of the LUTs 200 that specifics the correspondence relationship between the used amount of the color material corresponding to the color material CL1 of the printer body 300 and the used amount of the color material corresponding to the color material CL2 of the proof device 100.

(4-5) Example that Output Characteristic is Represented by Graininess Index Value IN1 Indicating Graininess of Color Reproduction Image:

The output characteristic indicated for the region included in the input color space is also represented by the graininess index value IN1, the gradation index value IN2, etc. other than the color difference $\Delta E$ as described above.

The graininess index value IN1 is the index value that as the value is smaller, the graininess of the color reproduction image 160 is reduced. When the color conversion is performed to reduce the graininess, generally, in a picture image, etc., the image quality can be improved. On the other hand, when the color conversion is performed to increase the graininess for presenting the vivid color, in a graph image, etc., the image quality can be improved.

Figure 20:
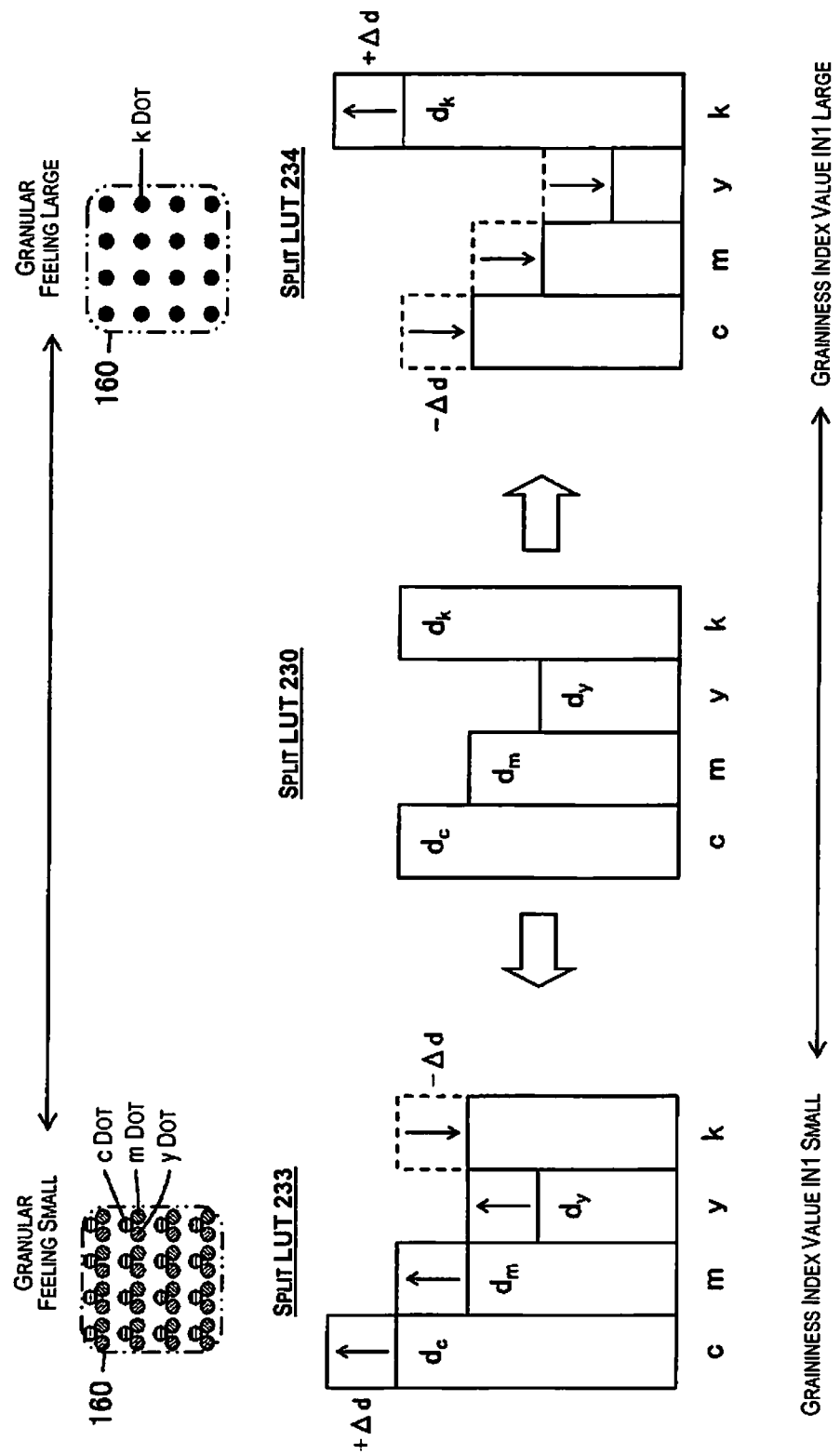
FIG. 20 is a diagram schematically exemplifying a condition that a graininess of a color reproduction image changes.

FIG. 20 schematically exemplifies a condition changing the graininess of the color reproduction image 160.

The split LUT to change the graininess of the color reproduction image 160 can be generated by changing, for example, the output used amounts $d_c$, $d_m$, $d_y$, $d_k$, $d_{lc}$, $d_{lm}$ of the split LUT 230 described above. For the simplicity, the example of FIG. 20 shows a condition that when one dot of k is equivalent to the combination of one dot of c, one dot of m, and one dot of y, at least a part of the used amount $d_k$ of k is replaced with at least a part of the used amount of cmy. When at least a part $\Delta d$ of the used amount $d_k$ of k is replaced to the used amount of cmy, the split LUT 233 that forms the color reproduction image 160 having small graininess that the index value IN1 is small, that is, the k dots, the brightness is relatively low, are few or not existed, or the cmy dots, the brightness is relatively high, are many can be generated. The split LUT 233 generated for each region R0 is the split LUT of "emphasis on low granular feeling" shown in FIG. 5. Also, when at least a part $\Delta d$ of the used amounts $d_c$, $d_m$, $d_y$ of cmy is replaced to the used amount of k, the split LUT 234 that forms the color reproduction image 160 having large graininess that the graininess index value IN1 is large, that is, the cmy dots, the brightness is relatively high, are few or not existed, and the k dots, the brightness is relatively low or not existed, are many can be generated.

In order to change the graininess of the color reproduction image 160, more than or equal to two dots of one dot of c and one dot of lc may be replaced, or more than or equal to two dots of one dot of m and one dot of lm may be replaced. When at least a part $\Delta d$ of the used amount $d_c$ of c is replaced to the used amount of lc, or when at least a part $\Delta d$ of the used amount $d_m$ is replaced to the used amount of lm, the split LUT 233 of "emphasis on low granular feeling" that forms the color reproduction image 160 having small graininess that the graininess index value IN1 is small, that is, the cm dots, the brightness is relatively low, are few or not existed, or the lclm dots, the brightness is relatively high, are many can be generated.

Further, the split LUTs 233, 234 may be generated based on the graininess index value IN1.

The graininess index value IN1 that quantifies the graininess of the color reproduction image 160 can be presented as, for example, the following Equation.

[Equation (7)]

$$IN1 = a_L \int \sqrt{WS(u)} VTF(u) du \quad (7)$$

Here, $a_L$ is a brightness correction item, WS(u) is Wiener spectrum of an image, VTF is a visual spatial frequency characteristic, and u is a spatial frequency characteristic. The idea of the graininess index value IN1 discloses in, for example, Makoto Fujino, Image Quality Evaluation of Inkjet Prints, Japan Hardcopy '99, P. 291-294. Equation (7) indicates one-dimension, but the spatial frequency characteristic of the two-dimension image can be easily calculated as the function of the spatial frequency characteristics u, v.

The graininess index value IN1 is the graininess (or noise) felt by the observer when the observer views a color reproduction image. As the IN1 is small, the graininess felt by the observer becomes smaller. Needless to say, the IN1 is an index value that evaluates the graininess when the color reproduction image is formed, and it may be possible to use other equations. For example, Japanese Laid-open Patent Application Publication No. 2007-516663 discloses the detailed calculation for the graininess index value IN1.

The graininess index value IN1 can be calculated based on, for example, the multivalued data for the formation of the color reproduction image 160 obtained by the halftone process of S308 in FIG. 13, that is, the multivalued data representing the formation condition of dots corresponding to the used amounts $d_c$, $d_m$, $d_y$, $d_k$, $d_{lc}$, $d_{lm}$ of the color materials. If it has the multivalued data, the IN1 can be calculated by simulating the formation condition of dots without forming the actual color reproduction image 160 on the printing material M2. Accordingly, when the IN1 is calculated from the multivalued data obtained by performing the aforementioned halftone process to a solid image (macroscopically uniform image) of the output used amounts $d_c$, $d_m$, $d_y$, $d_k$, $d_{lc}$, $d_{lm}$ associated with each of the grid points G2, G3 configuring the split LUT 230, the graininess index value IN1 can be associated with each of the grid points G2, G3. Needless to say, the color reproduction image 160 formed on the printing material M2 is read by an image reading apparatus, etc. such as a scanner, and the multivalued data for the formation of the color reproduction image 160 is obtained based on the read information, and the IN1 may be calculated based on the multivalued data.

Figure 21:
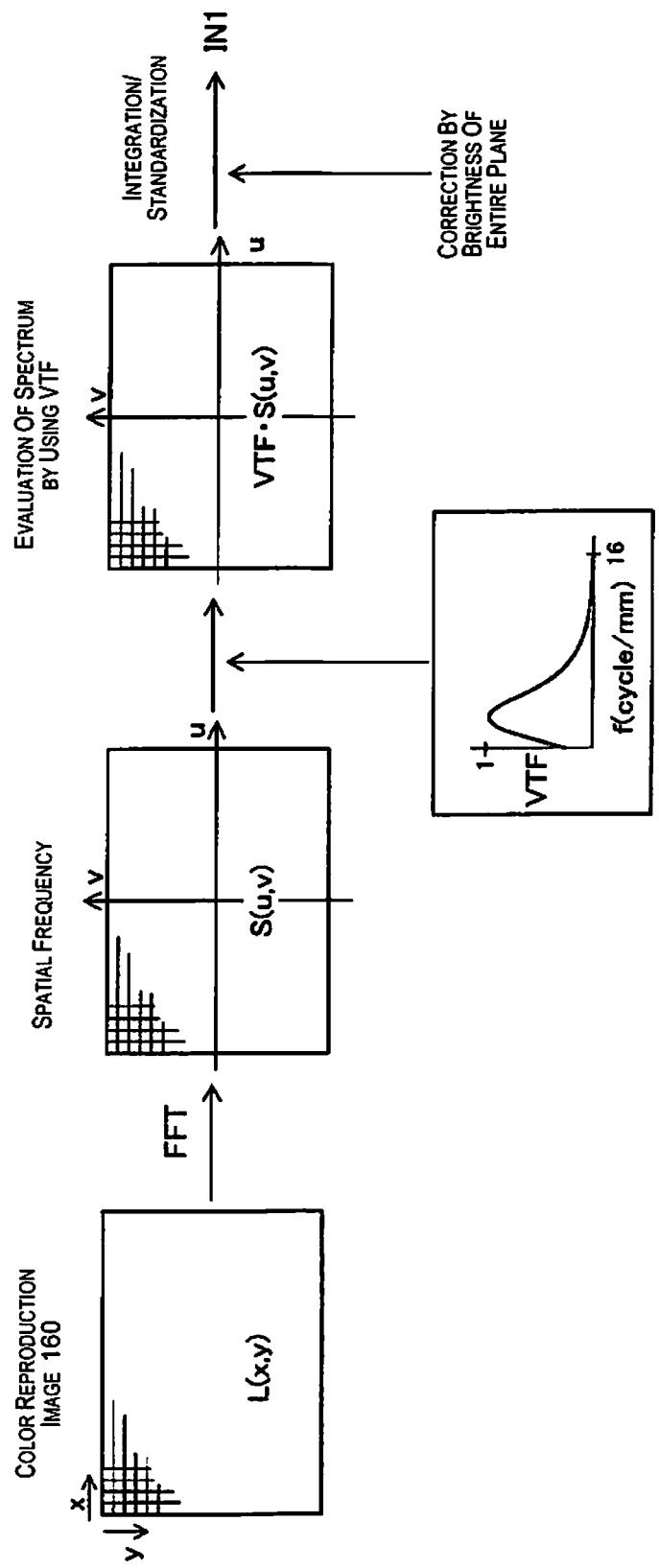
FIG. 21 is a diagram schematically exemplifying a condition that a graininess index value IN1 is calculated.

FIG. 21 schematically exemplifies a condition that calculates the graininess index value IN1. First, the brightness L(x, y) for each pixel of the color reproduction image 160 is calculated based on the multivalued data for the formation of the color reproduction image 160. When the dots are not formed in the coordinate (x, y), the brightness of the printing material M2 itself becomes L(x, y). When the dots are formed in the coordinate (x, y), the brightness L(x, y) is calculated based on the area ratio of dots with respect to the pixels, the brightness of the dot portion, and the brightness of the printing material M2 itself (e.g., proportional distribution of the brightness). When the brightness L(x, y) is calculated as shown in the left end of FIG. 21, the FFT (Fast Fourier Transformation) is executed for the brightness L(x, y), and the spectrum S(u, v) of the spatial frequency characteristic is obtained. The spectrum S(u, v) is configured by the real part Re(u, v) and the imaginary part Im(u, v), and it is S(u, v)=Re(u, v)+jIm(u, v). The spectrum S(u, v) corresponds to the aforementioned Wiener spectrum.

Next, in order to calculate the size f(u, v) of the spatial frequency characteristic (cycle/mm) with respect to the coordinate (u, v), the lowest frequency of the color reproduction image 160 for a simulation target is calculated. The simulation target is the frequency that oscillates one time in the color reproduction image 160 formed by the multivalued data for the simulation target, and is defined by the scanning direction (X-direction) and the sub-scanning direction (Y-direction), respectively. For example, when 1 inch is defined as 25.4 mm, the lowest frequency $e_u$ of the scanning direction is defined as X resolution/(the number of pixels in the X-direction×25.4), and the lowest frequency $e_v$ of the sub-scanning direction is defined as Y resolution/(the number of pixels of Y-direction×25.4). It is possible that the size f(u, v) of the spatial frequency characteristic in the given coordinate (u, v) is calculated as $\{(e_u \cdot u)^2 + (e_v \cdot v)^2\}_{1/2}$.

On the other hand, the human eye has different sensitivity for the brightness in response to the size f(u, v) of the spatial frequency characteristic. The visual spatial frequency characteristic feature is, for example, the feature as VTF(f) shown in the lower middle of FIG. 21. The VTF(f) is VTF (f)=5.05×exp(−0.138·d·π·f/180)×{1 exp(−0.1·d·π·f/180)}. Here, d represents a distance between the color reproduction image and human eye, and f represents the size f of the spatial frequency characteristic. The "f" is represented as the function of (u, v) so that the visual spatial frequency characteristic feature VTF can be defined as the function VTF(u, v) of (u, v). When the VTF is obtained, the square of the VTF and the square of spectrum S(u, v) are multiplied, and the integration is performed for all of the pixels (u, v). The square root of the obtained integration value (defined as Pow) is divided by the number of all pixels and is standardized, and an objective criterion (defined as Int) that is not dependent on the number of pixels of the original multivalued data is calculated.

$$\text{Int} = \text{Pow}^{1/2}/\text{number of all pixels}$$

If the number of pixels of the multivalued data is always the same number of pixels in the case of the graininess evaluation, the standardization may not be required.

The graininess index value IN1 may be considered the effects of the brightness of the entire color reproduction image 160. Even though the spectrum of the spatial frequency characteristic is the same, the human eye gets different impressions when the entire color reproduction image is bright and when it is dark. It may be corrected as the graininess that is easily felt when the entirety is bright. Therefore, for example, the brightness average (Ave) of all pixels of the color reproduction image 160 is calculated, and the correction coefficient $a(L) = \{(Ave+16)/116\}^{0.8}$ by the brightness of the entire color reproduction image may be the graininess index value IN1 by multiplying the aforementioned Int.

$$IN1 = a(L) \cdot \text{Int}$$

The correction coefficient a(L) corresponds to the aforementioned brightness correction item $a_L$.

From the above, in the setting screen 500 shown in FIG. 18, the "emphasis on low granular feeling" is selected for the "complexion color region" (first region R1), and the output characteristic other than the "emphasis on low granular feeling" (e.g., "emphasis on color difference") may be selected for the "gray region" (second region R2). For example, the "emphasis on low granular feeling" split LUT 233 for the complexion color region (R1) has the first output characteristic that the graininess index value IN1 of the color reproduction image 160 formed by the colors within the complexion color region (R1) is less than or equal to the positive threshold value TH3 (within the third range). Further, as a result that the graininess is not emphasized, the "emphasis on color difference" split LUT 232 for the gray region (R2) has the second output characteristic that the graininess index value IN1 of the color reproduction image 160 formed from the colors within the gray region (R2) is more than the threshold value TH3 (outside of the third range). It includes IN1<TH3 within the third range.

In reference to FIGS. 2 and 3, the output used amounts $d_c$, $d_m$, $d_y$, $d_k$, $d_{lc}$, $d_{lm}$ of the complexion color region (R1) included in the LUT 200 are set to indicate the first output characteristic that becomes IN1≤TH3 (within the third range). The output used amounts $d_c$, $d_m$, $d_y$, $d_k$, $d_{lc}$, $d_{lm}$ of the gray region (R2) included in the LUT 200 are set to indicate the second output characteristic that becomes IN1>TH3 (within the third range). Therefore, in one of the LUTs 200, the correspondence relationship indicating the first output characteristic such as the "emphasis on low granular feeling" for the complexion color region (R1) is specified, and the correspondence relationship indicating the second output characteristic such as, for example, the "emphasis on color difference" for the gray region (R2) is specified.

Here, the graininess index value IN1 of the color reproduction image 160 that was converted from the complexion color region (R1) included in the CMYK color space in accordance with the LUT 200 is less than or equal to TH3 (within the third range). Also, the graininess index value IN1 of the color reproduction image 160 that was converted from the gray region (R2) included in the CMYK color space in accordance with the LUT 200 may be more than TH3 (outside of the third range).

When the color reproduction image 160 having a gradation that gradually increases of reduces the used amounts (e.g., Dc, Dm, Dy, Dk) of the first color material CL1 is formed, the graininess index value IN1 of the region within the density range in the color reproduction image 160 is less than or equal to TH3, and when the graininess index value IN1 in the region within a different density range is more than TH3, the region indicating the "emphasis on low granular feeling" output characteristic and the different region indicating other than the "emphasis on low granular feeling" output characteristic are existed in one LUT 200.

As described above, in one LUT 200, the correspondence relationship that the graininess index value IN1 for the first region R1 within the input color space becomes within the third range is specified, and the correspondence relationship indicating the second output characteristic that is different from the "emphasis on low granular feeling" for the second region R2 within the input color space is specified. Therefore, the present technology can realize the color reproduction target of the graininess intended by the user in each region R0 of the input color space by one LUT 200 that specifies the correspondence relationship between the used amounts of color materials matching with the color material CL1 of the printer body 300 and the used amounts of color materials matching with the color material CL2 of the proof device 100.

(4-6) Example of Output Characteristic, which is Represented by Gradation Index Value IN2, Representing Gradation of Color Reproduction Image:

The gradation index value IN2 is the index value that as it is small, the gradation change of the color reproduction image 160 becomes smooth. When the color conversion is generally performed for providing smooth gradation change in a picture image, etc., the image quality can be improved. On the other hand, as the color conversion to provide vivid color in a graph image, etc., when the gradation change becomes rough, it may be possible to improve the image quality.

Figure 22:
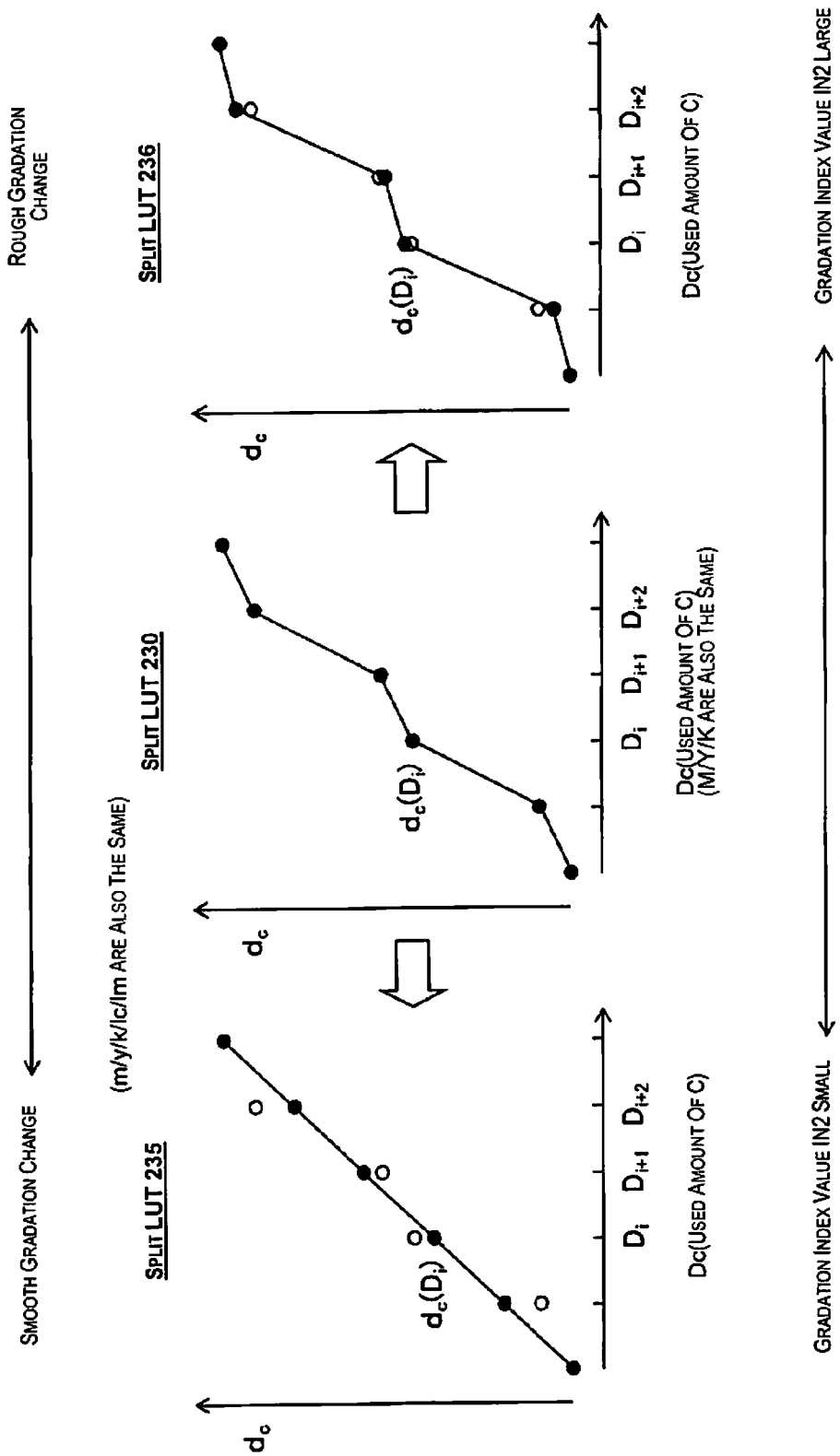
FIG. 22 is a diagram schematically exemplifying a condition that a gradation of a color reproduction image changes.

FIG. 22 schematically exemplifies a condition that changes the gradation of the color reproduction image 160.

The split LUT for changing the gradation of the color reproduction image 160 can be generated by changing, for example, the aforementioned output used amounts $d_c$, $d_m$, $d_y$, $d_k$, $d_{lc}$, $d_{lm}$ of the split LUT 230. For simplicity, the examples shown in FIG. 22 show the input used amount Dc of C of the CMYK color space in the lateral axis, that is, the coordinate of C of the grid points, and it shows the output used amount $d_c$ of c of the cmyklclm color space in the vertical axis, that is, the used amount of the second color material CL2 of c stored in the grid points. Needless to say, the input used amounts Dm, Dy, Dk of M, Y, K of the CMYK color space can be applied in the lateral axis, and the output used amounts $d_m$, $d_y$, $d_k$, $d_{lc}$, $d_{lm}$ of m, y, k, lc, lm of the cmyklclm color space can be applied to the vertical axis. In FIG. 22, the white circles shown in the split LUTs 235, 236 indicate the output used amount in the original split LUT 230. In the example of FIG. 22, an input usage variable $D_i$ (i is an integer from 1 to n, n is an integer more than or equal to 3) is provided, and indicates the output usage variable $d_c(D_i)$ corresponding to $D_i$.

The condition that the gradation change is smooth means that the variation of the fine change $\Delta d_c(D_i)=\{d_c(D_{i+1})-d_c(D_i)\}/\Delta D$ of the output usage variable $d_c(D_i)$ is small. The condition that the gradation change is rough means that the variation of the fine change $\Delta d_c(D_i)$ is large. Therefore, the gradation index value IN2 may be defined as an average of an absolute value of the fine change $\Delta\Delta d_c(D_i)=\{\Delta d_c(D_{i+1})-\Delta d_c(D_i)\}/\Delta D$ of the fine change $\Delta d_c(D_i)$.

$$IN2=\Sigma\{|\Delta\Delta d_c(D_i)|\}/(n-2)$$

$\Sigma$ means the sum of $\{|\Delta\Delta d_c(D_i)|\}$ from i=1 to i=n-2.

As the obtained gradation index value IN2 is smaller, the gradation change becomes smooth, and as it is larger, the gradation change becomes rough. Accordingly, when the used amount (e.g., $d_c$) of the second color material CL2 is changed to restrain the variation of the change of the used amount (e.g., $d_c$) of the second color material CL2 with respect to the change of the used amount (e.g., Dc) of the first color material CL1, the split LUT 235 that the gradation index value IN2 is small, that is, the smooth color reproduction image 160 is formed can be generated. The split LUT 235 generated for each region R0 is the "emphasis on gradation" split LUT shown in FIG. 5. Further, when the used amount (e.g., $d_c$) of the second color material CL2 is changed to vary more the change of the used amount (e.g., $d_c$) of the second color material CL2 with respect to the change of the used amount (e.g., Dc) of the first color material CL1, the split LUT 236 that the gradation index value IN2 is large, that is, the color reproduction image 160 in which the gradation change is rough is formed can be generated.

Further, the split LUTs 235, 236 may be generated based on the gradation index value IN2.

From the above, in the setting screen 500 shown in FIG. 18, the "emphasis on gradation" may be selected for the "complexion color region" (first region R1), and the output characteristic other than the "emphasis on gradation" (e.g., "emphasis on color difference") may be selected for the "gray region" (second region R2). For example, the "emphasis on gradation" split LUT 235 for the complexion color region (R1) has the first output characteristic that the gradation index value IN2 of the color reproduction image 160 formed from the colors within the complexion color region (R1) is less than or equal to the positive threshold value TH4 (within the fourth range). Further, as a result that the gradation is not emphasized, the "emphasis on color difference" split LUT 232 for the gray region (R2) has the second output characteristic that the gradation index value IN2 of the color reproduction image 160 formed from the colors within the gray region (R2) may be more than the threshold value TH4. IN2<TH4 is included within the fourth range.

In reference to FIGS. 2 and 3, the output used amounts $d_c$, $d_m$, $d_y$, $d_k$, $d_{lc}$, $d_{lm}$ of the complexion color region (R1) included in the LUT 200 are set to indicate the first output characteristic so as to be IN2<TH4 (within the fourth range). At least a part of the output used amounts $d_c$, $d_m$, $d_y$, $d_k$, $d_{lc}$, $d_{lm}$ of the gray region (R2) included in the LUT 200 are set to indicate the second output characteristic so as to be IN2>TH4 (outside of the fourth range). With all these points, in one of the LUTs 200, the correspondence relationship indicating the first output characteristic as the "emphasis on gradation" for the complexion color region (R1) is specified, and the correspondence relationship indicating the second output characteristic as, for example, the "emphasis on color difference" for the gray region (R2) is specified.

Here, the gradation index value IN2 of the color reproduction image 160 that is converted from the complexion color region (R1) included in the CMYK color space in accordance with the LUT 200 is less than or equal to TH4 (within the fourth range). Further, the gradation index value IN2 of the color reproduction image 160 that is converted from the gray region (R2) included in the CMYK color space in accordance with the LUT 200 may be more than TH4 (outside of the fourth range).

When the color reproduction image 160 having a gradation that gradually increases of reduces the used amounts (e.g., Dc, Dm, Dy, Dk) of the first color material CL1 is formed, the gradation index value IN2 of the region within the density range in the color reproduction image 160 is less than or equal to TH4, and when the gradation index value IN2 in the region within a different density range is more than TH4, the region indicating the "emphasis on gradation" output characteristic and the different region indicating other than the "emphasis on gradation" output characteristic are existed in one LUT 200.

As described above, in one LUT 200, the correspondence relationship that the gradation index value IN2 for the first region R1 within the input color space becomes within the fourth range is specified, and the correspondence relationship indicating the second output characteristic that is different from the "emphasis on gradation" for the second region R2 within the input color space is specified. Therefore, the present technology can realize the color reproduction target of the gradation intended by the user in each region R0 of the input color space by one LUT 200 that specifies the correspondence relationship between the used amounts of color materials matching with the color material CL1 of the printer body 300 and the used amounts of color materials matching with the color material CL2 of the proof device 100.

(4-7) Example of Ink Save Output Characteristic:

For example, the split LUT indicating the ink save output characteristic can be generated by changing the output used amounts $d_c$, $d_m$, $d_y$, $d_k$, $d_{lm}$ of the aforementioned split LUT 230 to decease the sum of the output used amounts $d_c$, $d_m$, $d_y$, $d_k$, $d_{lc}$, $d_{lm}$ for the region R0 within the input color space. In reference to FIG. 20, for example, the lowest value of the used amounts $d_c$, $d_m$, $d_y$ of cmy is defined as $\Delta d$, and when $\Delta d$ of the used amounts $d_c$, $d_m$, $d_y$ is replaced to the used amount of k, the split LUT indicating the ink save output characteristic for the region R0 can be generated. Also, the used amount $d_{lc}$ of lc may be replaced to the used amount $d_c$ of c, or the used amount $d_{lm}$ of lm may be entirely replaced to the used amount $d_m$ of m.

(5) MODIFIED EMBODIMENTS

In the present invention, various modified embodiments can be considered.

For example, a recording apparatus such as a printer is connected to the computer that stores the LUT 200, and the used amount of the second color material is calculated from the used amount of the first color material in accordance with the aforementioned LUT 200, and when the color reproduction image is formed as to be the calculated used amount of the second color material in the recording apparatus, the computer and the recording apparatus configure the image-forming apparatus. Other than the recording apparatus, the image-forming apparatus includes an image output apparatus such as a display, etc. A color reproduction image includes an image displayed on the image screen of the image output apparatus.

The first color material used for the formation of the print material in the printing device may be other than the combination of CMYK, and it may be a combination of 5 colors, a combination of 3 colors, etc. The second color material used for the formation of the color reproduction image in the image-forming apparatus may be other than the combination of MCYKlclm, and it may be a combination of more than or equal to 7 colors, or a combination of less than or equal to 5 colors. The colors of the color materials capable of using the second color material may be other than cmyklclm, and include or (orange), gr (green), b (blue), v (violet), dy (dark-yellow), lk (light black), llk (light light black), non-colored, etc. The non-colored color material includes a color material giving glossiness to a printing material, a color material protecting a colored color material, etc.

A combination of the third color material and the fourth color material included in the first color material may be other than the combination of K and CMY, and it may be a combination of deep and pale of K, a combination of deep and pale of C, a combination of deep and pale of M, a combination of deep and pale of Y, etc.

The split LUT group 220 is preferably a plurality of split LUTs 230 that has the same target regions and different output characteristics as shown in FIG. 5, but it may be split LUTs having a combination of one output characteristic and one target region only. In this case, when the region is selected in the region selection fields 521, 522, . . . of the setting screen 500 shown in FIG. 18, the associated output characteristic is uniquely determined so that the output characteristic selection fields 531, 532, . . . may be removed from the setting screen 500.

(6) CONCLUSION

As described above, according to the present invention, by the various embodiments, it can provide technologies, etc. capable of realizing the color reproduction target intended by the user in each region of the input color space by one look-up table that specifies the correspondence relationship between the used amounts of the color material matching with the color materials of the printing device and the used amounts of the color materials matching with the color materials of the image-forming apparatus. Needless to say, even if the technique, etc., constituted only by the structural elements of an independent claim that does not have the structural elements of dependent claims, the aforementioned fundamental functions and effects can be obtained.

Further, a structure in which each structure disclosed in the aforementioned embodiments and modified embodiments are mutually replaced, combined, or changed, a structure in which known techniques, each structure disclosed in the aforementioned embodiments and modified embodiments are mutually replaced, combined or changed, etc., can also be put into practice. The present invention includes these structures, etc.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An image-forming apparatus comprising:
a printer that prints a color reproduction image;
a storage section that stores a four or more dimensional look-up table specifying a correspondence relationship between an used amount of a first color material with four or more colors and an used amount of a second color material with colors equal to or more than the colors of the first color material, with the colors of the first color material being used for a formation of a printing material in a printing device, with the colors of the second color material being used for printing of the color reproduction image in the printer, with the correspondence relationship of the four or more dimensional look-up table indicating both a first output characteristic for a first region that is defined by a first set of the colors of the first color material in the four or more dimensional look-up table, and a second output characteristic, which is different from the first output characteristic, for a second region, which is different from the first region and defined by a second set of the colors of the first color material in the four or more dimensional look-up table; and a central processing unit that performs a color conversion in reference to the four or more dimensional look-up table stored in the storage section, the printer printing the color reproduction image with the second color material according to the color conversion by the central processing unit, the first output characteristic for the first region and the second output characteristic for the second region having different values, the first output characteristic includes an output characteristic in which a first color difference between a color value of the first color material and a color value of the second color material under a first observation light source is within a first range for all of the first region, and a second color difference between a color value of the first color material and a color value of the second color material under a second observation light source, which is different from the first observation light source, is outside a second range, which is different from the first range, for at least part of the first region, and the second output characteristic includes an output characteristic in which the first color difference is outside the first range for at least part of the second region, and the second color difference is within the second range for all of the second region.

2. The color conversion apparatus according to claim 1, wherein the first output characteristic includes an output characteristic in which an index value representing a graininess of the color reproduction image is within a range; the second output characteristic includes an output characteristic in which an index value representing a graininess of the color reproduction image is outside of the range.

3. The color conversion apparatus according to claim 1, wherein the first output characteristic for the first region and the second output characteristic for the second region have different values, respectively, in at least one of a color difference between a color value of the first color material and a color value of the second color material under a predetermined observation light source, an index value representing a graininess of the color reproduction image, and an index value representing a gradation of the color reproduction image.

4. The color conversion apparatus according to claim 1, wherein the colors of the first color material includes black color and chromatic colors, the colors of the second color material includes black color and chromatic colors, the correspondence relationship of the four or more dimensional look-up table indicates a conversion in which used amounts of the chromatic colors of the second color material depending on both an used amount of the black color of the first color material and used amounts of the chromatic colors of the first color material.

5. The color conversion apparatus according to claim 1, wherein the central processing unit generates the four or more dimensional look-up table by synthesizing at least a first look-up table that specifies a correspondence relationship between the used amounts of the first and second color materials to indicate the first output characteristic for the first region, and a second look-up table that specifies a correspondence relationship between the used amounts of the first and second color materials to indicate the second output characteristic for the second region.

* * * * *